United States Patent
Yano et al.

(10) Patent No.: US 10,602,116 B2
(45) Date of Patent: Mar. 24, 2020

(54) INFORMATION PROCESSING APPARATUS, INFORMATION PROCESSING METHOD, AND PROGRAM FOR PERFORMING DISPLAY CONTROL

(71) Applicant: SONY CORPORATION, Tokyo (JP)

(72) Inventors: Akane Yano, Tokyo (JP); Tsubasa Tsukahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 15 days.

(21) Appl. No.: 15/743,439

(22) PCT Filed: May 25, 2016

(86) PCT No.: PCT/JP2016/065383
§ 371 (c)(1),
(2) Date: Jan. 10, 2018

(87) PCT Pub. No.: WO2017/022303
PCT Pub. Date: Feb. 9, 2017

(65) Prior Publication Data
US 2018/0205930 A1    Jul. 19, 2018

(30) Foreign Application Priority Data

Aug. 3, 2015 (JP) ................................ 2015-153201

(51) Int. Cl.
*H04N 13/00* (2018.01)
*G06T 19/20* (2011.01)
(Continued)

(52) U.S. Cl.
CPC ........... *H04N 13/128* (2018.05); *G06T 19/20* (2013.01); *H04N 13/172* (2018.05);
(Continued)

(58) Field of Classification Search
None
See application file for complete search history.

(56) References Cited

U.S. PATENT DOCUMENTS 9,282,175 B2 * 3/2016 Choi .................... H04M 1/0266
9,674,509 B2 * 6/2017 Kim ....................... H04N 13/31
(Continued)

*Primary Examiner* — Frederick D Bailey
(74) *Attorney, Agent, or Firm* — Paratus Law Group, PLLC

(57) ABSTRACT

There is provided an information processing device, an information processing method, and a program capable of suppressing a user's uncomfortable feeling while reducing the burden on the user, the information processing device including: a first display control unit configured to perform first control with respect to a position of a display object in a depth direction, the position being perceived by a user on a basis of an eye movement; and a second display control unit configured to perform second control with respect to a state of the display object, the state not including the position in the depth direction as a state. The first display control unit and the second display control unit perform control based on a first relation in a first range in the depth direction, and perform control based on a second relation in a second range in the depth direction, the second relation being different from the first relation, the second range being different from the first range.

19 Claims, 13 Drawing Sheets

(51) Int. Cl.
    *H04N 13/128*  (2018.01)
    *H04N 13/398*  (2018.01)
    *H04N 13/172*  (2018.01)
    *H04N 13/327*  (2018.01)
    *H04N 13/344*  (2018.01)
    *H04N 13/383*  (2018.01)

(52) U.S. Cl.
    CPC ......... *H04N 13/327* (2018.05); *H04N 13/344* (2018.05); *H04N 13/398* (2018.05); *H04N 13/383* (2018.05); *H04N 2013/0081* (2013.01)

(56) References Cited

U.S. PATENT DOCUMENTS

| | | | | |
|---|---|---|---|---|
| 2011/0304710 A1* | 12/2011 | Ito | ............................ | A63F 13/65 348/51 |
| 2012/0076399 A1* | 3/2012 | Yamaji | .................... | G06T 11/60 382/154 |
| 2012/0249746 A1* | 10/2012 | Cornog | ................. | H04N 13/128 348/47 |
| 2012/0327198 A1* | 12/2012 | Tsukagoshi | ............ | A61B 6/022 348/51 |
| 2013/0051660 A1* | 2/2013 | Shibuhisa | ............ | H04N 13/261 382/154 |
| 2013/0088573 A1* | 4/2013 | Collar | ................... | H04N 13/204 348/46 |
| 2013/0141435 A1* | 6/2013 | Cho | ......................... | G06T 15/50 345/426 |
| 2013/0169633 A1* | 7/2013 | Hattori | ................. | H04N 13/128 345/419 |
| 2014/0218487 A1* | 8/2014 | Lambert | .............. | H04N 13/359 348/51 |
| 2015/0022631 A1* | 1/2015 | Chang | .................. | H04N 13/128 348/43 |
| 2016/0171749 A1* | 6/2016 | Mizuo | .................. | H04N 13/128 382/190 |
| 2016/0205387 A1* | 7/2016 | Kasumi | .................... | G09G 5/00 348/53 |
| 2017/0054973 A1* | 2/2017 | Kasazumi | ............. | B60K 35/00 |

* cited by examiner

INFORMATION PROCESSING APPARATUS, INFORMATION PROCESSING METHOD, AND PROGRAM FOR PERFORMING DISPLAY CONTROL

CROSS REFERENCE TO PRIOR APPLICATION

This application is a National Stage Patent Application of PCT International Patent Application No. PCT/JP2016/065383 (filed on May 25, 2016) under 35 U.S.C. § 371, which claims priority to Japanese Patent Application No. 2015-153201 (filed on Aug. 3, 2015), which are all hereby incorporated by reference in their entirety.

TECHNICAL FIELD

The present disclosure relates to an information processing device, an information processing method, and a program.

BACKGROUND ART

In recent years, along with the development of imaging optical system technology, research and development has been conducted on a display device that displays an image so that the image is visually recognized as if the image was superimposed on an external image (hereinafter also referred to as superimpose an image). Such a display device includes a display device which has, for example, a half mirror or the like which displays an image (virtual image) while allowing external light to pass through the half mirror, and is mounted on the head.

However, in a case where the image is superimposed on the external image, the greater the difference between the convergence angle for the external image and the convergence angle for the image is, the greater the burden on the user observing the image and the external image is.

With respect to this, Patent Literature 1 discloses an invention relating to a glasses-type display device in which depending on the observation position of the user, the optical axis of image light and the optical axis of image light parallel to the image light are moved in a horizontal direction with respect to these optical axes. Hence, the difference between the convergence angle for the image and the convergence angle of the external image is adjusted to decrease, thereby reducing the burden on the user.

CITATION LIST

Patent Literature

Patent Literature 1: JP 2012-42654A

DISCLOSURE OF INVENTION

Technical Problem

However, in the invention disclosed in Patent Literature 1, while the burden on the user is reduced, there is a possibility that the user feels uncomfortable. For example, when the convergence angle for the image changes, the position of the image in the depth direction changes, and the state of the image observed by the user, for example, the size of the image changes. When the state of the image changes in this manner, the user may feel uncomfortable.

In view of this, the present disclosure proposes a new and improved information processing device, information processing method, and program capable of suppressing a user's uncomfortable feeling while reducing the burden on the user.

Solution to Problem

According to the present disclosure, there is provided an information processing device including: a first display control unit configured to perform first control with respect to a position of a display object in a depth direction, the position being perceived by a user on a basis of an eye movement; and a second display control unit configured to perform second control with respect to a state of the display object, the state not including the position in the depth direction as a state. The first display control unit and the second display control unit perform control based on a first relation in a first range in the depth direction, and perform control based on a second relation in a second range in the depth direction, the second relation being different from the first relation, the second range being different from the first range.

Further, according to the present disclosure, there is provided an information processing method including: by a display control unit, performing first control with respect to a position of a display object in a depth direction, the position being perceived by a user on a basis of an eye movement; performing second control with respect to a state of the display object, the state not including the position in the depth direction as a state; performing control based on a first relation in a first range in the depth direction; and performing control based on a second relation in a second range in the depth direction, the second relation being different from the first relation, the second range being different from the first range.

Further, according to the present disclosure, there is provided a program causing a computer to implement: a first display control function of performing first control with respect to a position of a display object in a depth direction, the position being perceived by a user on a basis of an eye movement; a second display control function of performing second control with respect to a state of the display object, the state not including the position in the depth direction as a state; and a function of performing, by the first display control function and the second display control function, control based on a first relation in a first range in the depth direction, and performing control based on a second relation in a second range in the depth direction, the second relation being different from the first relation, the second range being different from the first range.

Advantageous Effects of Invention

As described above, according to the present disclosure, there is provided an information processing device, an information processing method, and a program capable of suppressing a user's uncomfortable feeling while reducing the burden on the user. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
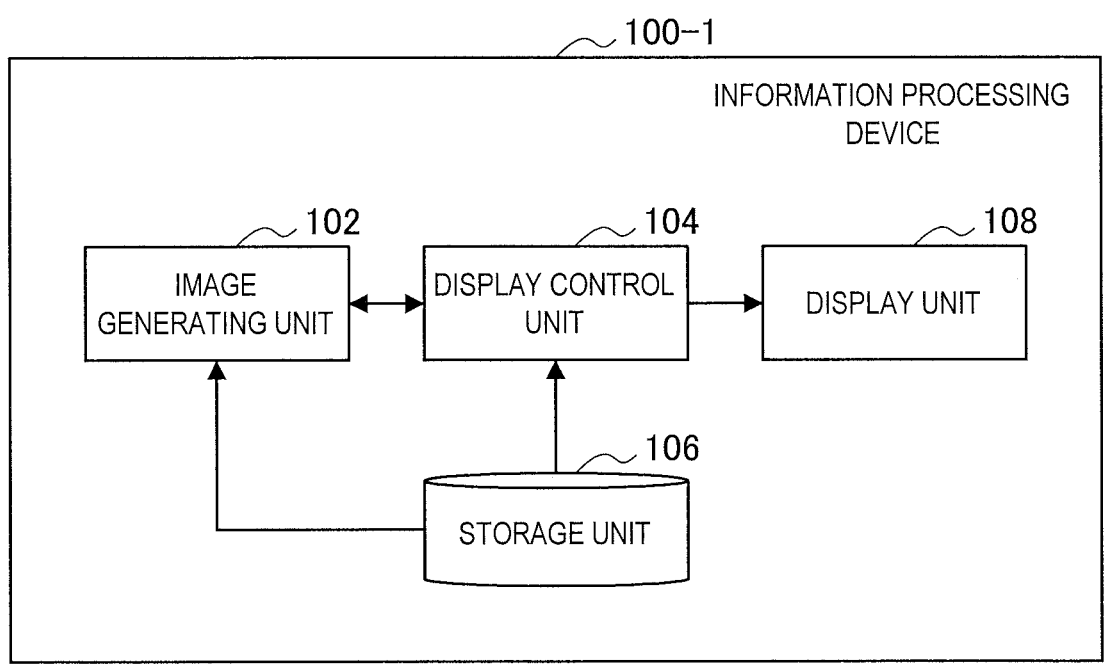
FIG. 1 is a block diagram showing an example of a schematic functional configuration of an information processing device according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be now made in the following order.
1. First embodiment (control of position and state based on predetermined relation)
2. Second embodiment (control based on predetermined relation and user information)
3. Third embodiment (control based on predetermined relation and user surrounding environment)
4. Hardware configuration of information processing device according to embodiment of the present disclosure
5. Conclusion In addition, for convenience of description, each of information processing devices 100 according to a first to third embodiments is assigned numbers corresponding to the embodiments at the end of the information processing devices 100 like an information processing device 100-1 to an information processing device 100-3 so that they are distinguishable.

1. First Embodiment (Control of Position and State Based on Predetermined Relation)

First, the information processing device 100-1 according to a first embodiment of the present disclosure will be described
<1-1. Device Configuration>
A functional configuration of the information processing device 100-1 according to the first embodiment of the present disclosure will be described with reference to FIG. 1. FIG. 1 is a block diagram showing an example of a schematic functional configuration of the information processing device 100-1 according to the first embodiment of the present disclosure.

As shown in FIG. 1, the information processing device 100-1 includes an image generating unit 102, a display control unit 104, a storage unit 106, and a display unit 108.

The image generating unit 102 generates an image to be displayed on the display unit 108. Specifically, the image generating unit 102 generates the image for causing the user to perceive the stereoscopic vision object as a display object on the basis of an instruction from the display control unit 104. For example, when an instruction to generate the image for stereoscopic vision is issued from the display control unit 104, the image generating unit 102 generates the left eye image and the right eye image (hereinafter also collectively referred to as image for stereoscopic vision) on the basis of the information regarding the image stored in the storage unit 106. Note that the images for stereoscopic vision may be stored in the storage unit 106, or may be acquired from an external device through a communication unit or the like instead of the image generating unit 102.

Figure 2:
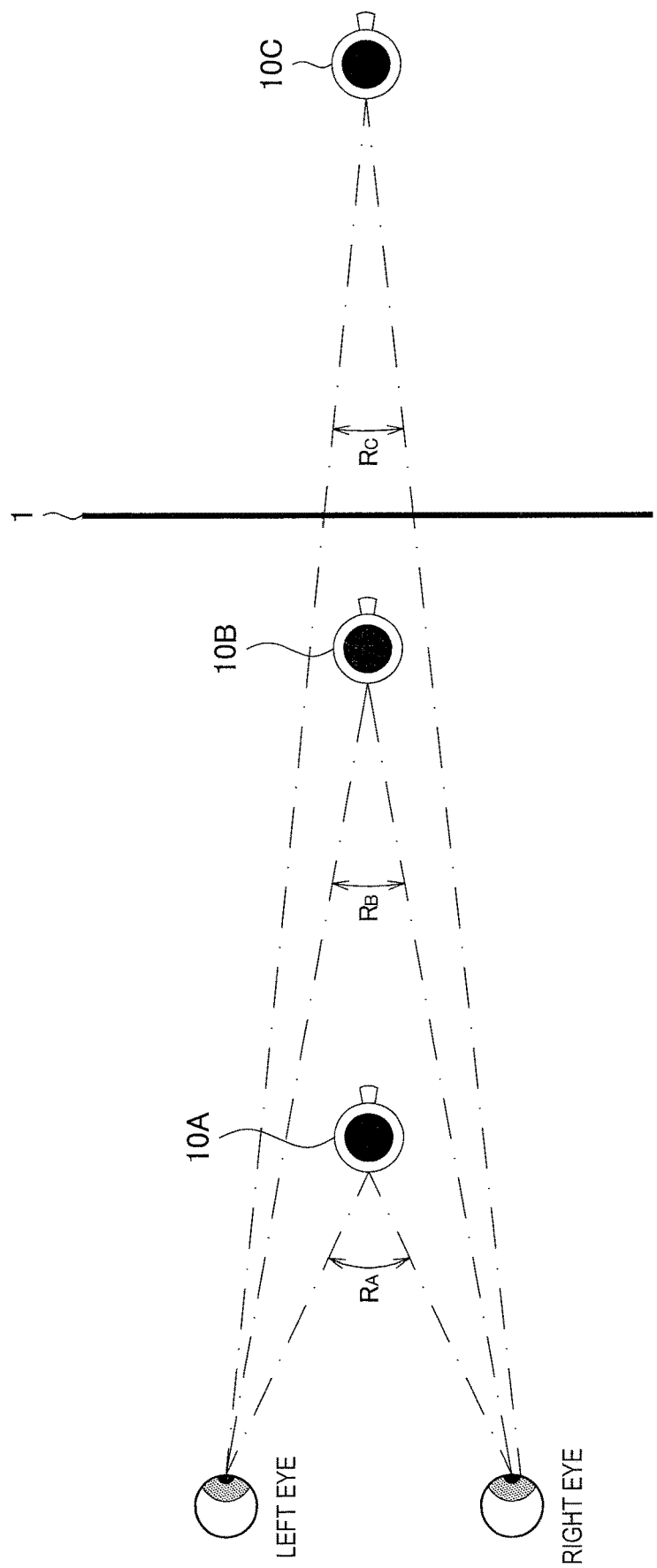
FIG. 2 is a diagram illustrating basic processing of display control of a stereoscopic vision object according to the embodiment.

The display control unit 104 performs display control of the image obtained from the image generating unit 102. Specifically, the display control unit 104, as a first display control unit, performs control (first control) with respect to the position in the depth direction perceived by the user on the basis of an eye movement. More specifically, the display control unit 104 controls the position of the stereoscopic vision object perceived by the user in the depth direction by controlling the display position of the image for stereoscopic vision, that is, each of the left eye image and the right eye image that is generated by the image generating unit 102, in the horizontal direction. Further, the display control processing of the stereoscopic vision object will be described in detail with reference to FIG. 2. FIG. 2 is a diagram illustrating basic processing of display control of a stereoscopic vision object according to the present embodiment.

The display control unit 104 performs processing for stereoscopically displaying the acquired image for stereoscopic vision. Specifically, in a case where the image for stereoscopic vision is set to be displayed on a virtual screen 1 as shown in FIG. 2, the display control unit 104 displaces the display position of the image for stereoscopic vision, that is, each of the left eye image and the right eye image in the horizontal direction, that is, in the long-side direction of the virtual screen 1, thereby controlling the parallax between the left eye image and the right eye image. Note that, although the position of the virtual screen 1 can be optically set, it may be variable.

For example, in a case where the user is caused to perceive a stereoscopic vision object as if the stereoscopic vision object was located in front of the virtual screen 1, that is, the stereoscopic vision object protrudes toward the user, the display control unit 104 shifts the left eye image to the right in the horizontal direction and the right eye image to the left in the horizontal direction individually. In this case, the user perceives the stereoscopic vision object 10A which protrudes from the virtual screen 1 toward the user as shown in FIG. 2.

In addition, for example, in a case where the user is caused to perceive the stereoscopic vision object as if the stereovision object was located behind the virtual screen 1, that is, the stereoscopic vision object retracted toward the user, the display, control unit 104 shifts the left eye image to the left in the horizontal direction and the right eye image to the right in the horizontal direction individually. In this case, the user perceives a stereoscopic vision object 10C which retracts from the virtual screen 1 as shown in FIG. 2 toward the user.

Note that in a case where there is no parallax between the left eye image and the right eye image or in a case where the parallax is small enough not to be perceived by the human, a planar image for stereoscopic vision is perceived. In this case, for example, the user can see an image for stereoscopic vision on the virtual screen 1 as shown in FIG. 2.

Here, when the position of the stereoscopic vision object in the depth direction changes, the convergence angle of the human perceiving the stereoscopic vision object also changes. For example, a convergence angle $R_A$ of the user with respect to a stereoscopic vision object 10A positioned in front of a stereoscopic vision object 10B (closer to the user) is smaller than a convergence angle $R_B$ with respect to the stereoscopic vision object 10B.

With respect to this, it is known that the larger the convergence angle is, the greater the burden on the user is. For example, it is recommended that the observation time be shortened as the convergence angle increases.

In addition, it is also known that a change in the convergence angle causes a burden on the user. For example, in a case where a plurality of stereoscopic vision objects with different convergence angles are displayed, the user changes the convergence angle when viewing each of the plurality of stereoscopic vision objects.

On the other hand, an information processing device is provided which changes the convergence angle in order to reduce the burden on the user. However, in this information processing device, when the convergence angle for the image changes, the position of the image in the depth direction changes, and as a result, a way how the image appears changes. Hence, there is the possibility that the information processing device gives the user an uncomfortable feeling with respect to how the image appears.

In view of this, the information processing device 100 according to each embodiment of the present disclosure has technical features to be described later, whereby it is possible to reduce the burden on the user without giving the user an uncomfortable feeling.

Returning to the description of the functional configuration of the information processing device 100-1 with reference to FIG. 1, the storage unit 106 stores information regarding the image displayed on the display unit 108 and information regarding the display control of the image.

The display unit 108 displays the image on the basis of an instruction from the display control unit 104. Specifically, the display unit 108 displays the image for stereoscopic vision provided from the display control unit 104 in a predetermined stereoscopic vision system. For example, while the predetermined stereoscopic vision system can be a scope system such as a head mount display (HMD) mounted on the head of the user, the stereoscopic vision system may be other systems such as a glasses system including a liquid crystal shutter type, a polarization filter type and the like, or a glasses-free system including a lenticular type, a parallax barrier type and the like.

In addition, while the display method of the display unit 108 can be a so-called optical see-through method in which an image of a virtual image is displayed while transmitting an external image by using a half mirror or the like, other display methods may be used. For example, the display method may be a so-called video see-through method in which an external image is acquired using an imaging device and a real image obtained by superimposing an image on the acquired external image is displayed, or may be a retinal projection method in which an image is formed by directly irradiating the retina with image light.

<1-2. Technical Features>

Next, the technical features of the information processing device 100-1 according to the present embodiment will be described.

The display control unit 104 performs first control and second control with respect to the display object. Specifically, the first control is control with respect to a position in the depth direction as described above, and the second control is control with respect to a state of the stereoscopic vision object where the state of the stereoscopic vision object does not include the position in the depth direction as a state. Note that in the following description, "position" means "position in the depth direction" unless mentioned in particular.

((Second Control: Control with Respect to State of Display Object))

First, control with respect to the state of the stereoscopic vision object will be described. The display control unit 104, as the second display control unit, performs control with respect to the state of the stereoscopic vision object where the state of the stereoscopic vision object does not include the position in the depth direction as a state. Specifically, the state of the stereoscopic vision object is a size of the stereoscopic vision object. The display control unit 104 controls the size of the stereoscopic vision object by controlling the size of the image for stereoscopic vision relating to the stereoscopic vision object.

Note that the state of the stereoscopic vision object may be another state as long as it is a state which makes the user feel the depth (perspective) with respect to the stereoscopic vision object. For example, the state of the stereoscopic vision object may include a color, luminance, shade, density or movement speed of the stereoscopic vision object.

((Range and Relation with Respect to Display Control))

The display control unit 104 performs different display control depending on each range in the depth direction. Specifically, the display control unit 104 performs control based on the first relation in the first range in the depth direction, and performs control based on the second relation different from the first relation in the second range in the depth direction different from the first range. In addition, in the third range in the depth direction, the display control unit 104 performs control based on the correspondence relation with respect to the presence or absence of control between the first control and the second control. Hereinafter, the display control in each range will be described in detail.

(First Range and Second Range)

The display control in the first range has a relative relation with that in the second range. Specifically, in the control based on the first relation performed in the first range, with the first control, an amount relating to a change in a position with respect to a position in the depth direction at which the display object is perceived (hereinafter also referred to as reference position) is smaller than an amount relating to a change in the position in the control based on the second relation. In addition, with the second control, an amount relating to a change in a state with respect to the state of the display object at the reference position is larger than an amount relating to a change in the state in the control based on the second relation. Further, the first range is a range closer to the user in the depth direction than the second range.

In addition, the relation (first relation) between the first control and the second control in the first range is a correlation with respect to the control amount between the first control and the second control. Specifically, the correlation is a relation in which a control amount of one of the first control and the second control is a control amount corresponding to a difference between a control amount of the other, and a control amount of the other at the reference position. For example, the display control unit 104 controls the stereoscopic vision object to a magnitude corresponding to a difference between a control amount of a position in the depth direction with respect to a certain position of the stereoscopic vision object in the depth direction and the control amount with respect to the reference position.

In addition, the relation (second relation) between the first control and the second control in the second range is a correspondence relation with respect to the presence or absence of control. Specifically, the second relation is a first correspondence relation to be described later, that is, a relation in which a change in the position in the depth direction with respect to the reference position with the first control is made and a change in the state with respect to the state of the stereoscopic vision object at the reference position with the second control is not made. Note that the second relation may be a correlation as in the first range.

Figure 3:
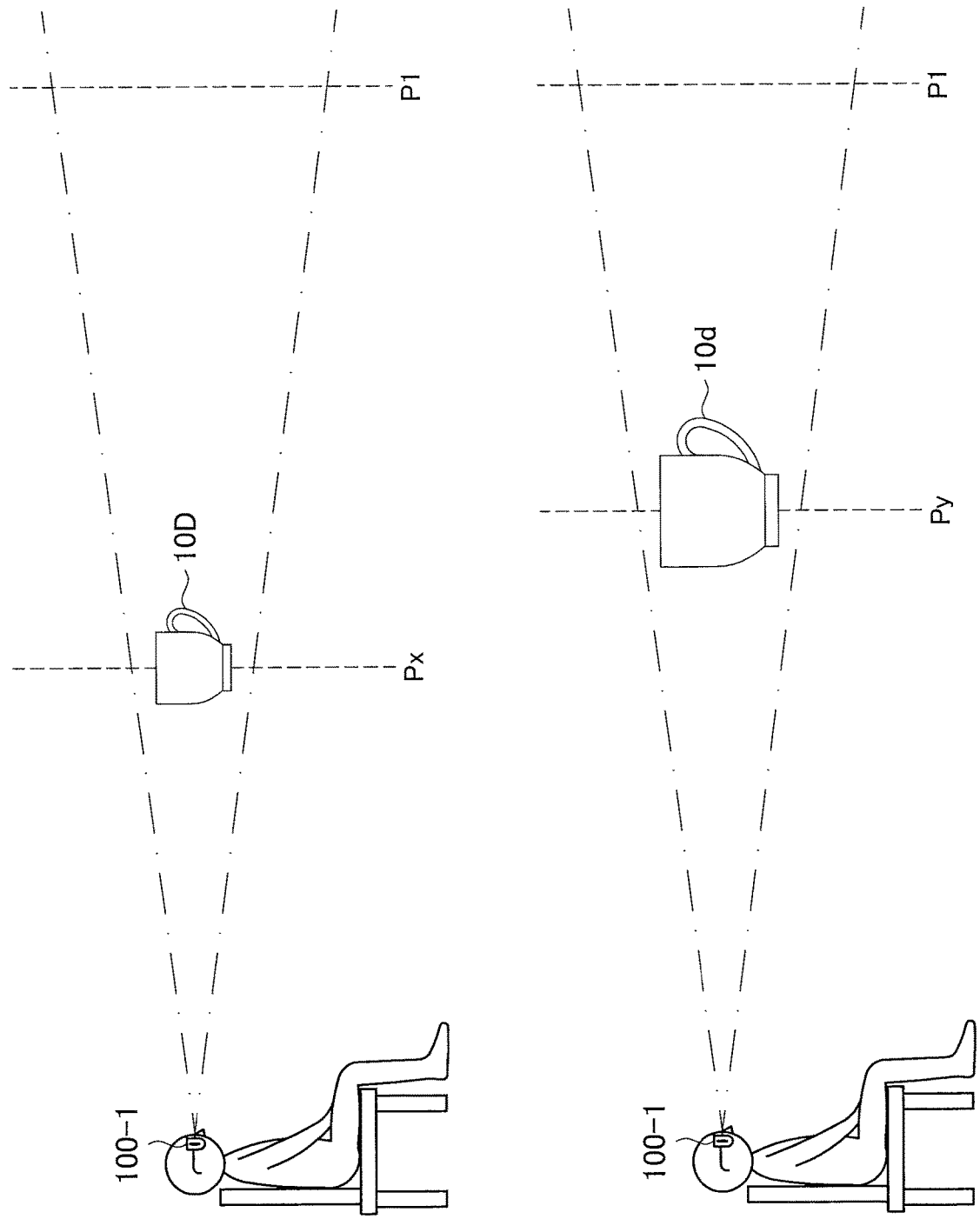
FIG. 3 is a diagram for describing an example of display control processing of the stereoscopic vision object according to a correlation in the information processing device according to the embodiment.

Further, with reference to FIG. 3, the display control processing of the stereoscopic vision object in the first range and the second range will be described in detail. FIG. 3 is a diagram for describing an example of display control processing of stereoscopic vision objects in the first range and the second range of the information processing device 100-1 according to the present embodiment. Note that the upper part of FIG. 3 is a diagram showing a perceived stereoscopic vision object, and the lower part is a diagram showing a stereoscopic vision object after control according to the present embodiment.

First, the display control unit 104 decides whether the reference position is closer to the user than the first position. For example, the display control unit 104 decides whether a reference position Px of a perceived stereoscopic vision object 10D is closer to the user who wears the information processing device 100-1 than a first position P1 as shown in the upper part of FIG. 3. The first range is a range closer to the user than the first position and the second range is a range more distant from the user than the first position. Note that the first position can be a position at which the user starts to feel the burden of visually recognizing the stereoscopic vision object. For example, the first position can be a position 1.5 to 3 meters away from the user in the depth direction. Needless to say, since the first position suitable for a variety of factors can vary, the distance from the user to the first position in the depth direction may be shorter or longer than the exemplified length.

Note that the above decision processing may be performed on the basis of a distance (hereinafter also referred to as observation distance) from the user to the reference position. For example, the observation distance can be calculated from the protrusion amount from the virtual screen 1 on which the image for stereoscopic vision is displayed and which has the fixed distance from the user. In addition, in a case where the position of the stereoscopic vision object is mapped to an actual space, the observation distance may be calculated by calculating the distance to the position in the actual space corresponding to the position of the stereoscopic vision object using a distance sensor or the like. In addition, the display control unit 104 may decide whether the reference position is present between the first position and a second position which is to be described later.

In a case where it is decided that the reference position is closer than the first position, the display control unit 104 determines the control amounts of the first control and the second control on the basis of the reference position. Specifically, the display control unit 104 determines to set the amount of the first control to an amount corresponding to a predetermined ratio to the amount of the first control at the reference position. The predetermined ratio is smaller than the ratio in the second range. For example, the display control unit 104 determines, as the parallax amount, an amount, for example, 0.9 (90%), corresponding to a predetermined ratio of the parallax amount at the reference position Px as shown in the upper part of FIG. 3. Note that a predetermined difference value may be used instead of the predetermined ratio of change. In this case, for example, the display control unit 104 determines, as the parallax amount, an amount obtained by subtracting a predetermined difference value from the parallax amount at the reference position.

Note that the amount relating to the above change may be a variable amount based on the reference position. Here, the likeliness of the occurrence of an uncomfortable feeling with respect to the first control and the second control may vary depending on the reference position. For example, in a case where the reference position is closer to the second position described above, the user is likely to have an uncomfortable feeling about control of the size of the display object. In view of this, the display control unit 104 determines the amount relating to the change on the basis of the reference position. For example, the display control unit 104 determines the rate of the change with respect to the reference position according to the observation distance. In this case, the first control amount and the second control amount are determined on the basis of the reference position, whereby it is possible to suppress the occurrence of the uncomfortable feeling of the user. Note that in a case where the reference position is closer to the second position described above, the burden increases because the convergence angle of the user increases. Hence, in a case where emphasis is placed on the burden on the user, the amount relating to the change in the position may be increased as the reference position becomes closer to the second position.

In addition, the display control unit 104 determines the control amount of the state of the stereoscopic vision object on the basis of the reference position. Specifically, the display control unit 104 determines, as the amount of the second control, an amount corresponding to a predetermined ratio to the state at the reference position. The predetermined ratio is larger than the ratio in the second range. For example, the display control unit 104 determines, the size of the stereoscopic vision object, an amount corresponding to a predetermined ratio, for example, 1.1 (110%), to the size at the reference position Px as shown in the upper part of FIG. 3. Note that a predetermined difference value may be used instead of the predetermined ratio of change. In this case, for example, the display control unit 104 determines, as the size of the stereoscopic vision object, a size obtained by adding the predetermined difference value to the size at the reference position.

Note that the display control unit 104 may determine a control amount of one of the first control and the second control on the basis of the reference position, and a control amount of the other may be determined according to the determined control amount of the one. Specifically, the display control unit 104 determines the control amount of the state of the stereoscopic vision object according to the difference between the determined control amount of the position in the depth direction and the control amount of the position in the depth direction with respect to the reference position. For example, the display control unit 104 determines the control amount (for example, enlargement ratio) of the size of the stereoscopic vision object according to the difference between the control amount for causing the user to perceive the stereoscopic vision object at a position Py as shown in the lower part of FIG. 3 and the control amount for causing the user to perceive the stereoscopic vision object at the position Px as shown in the upper part of FIG. 3.

Next, the display control unit 104 performs the first control and the second control on the basis of the determined control amount. For example, as shown in FIG. 3, the display control unit 104 arranges a stereoscopic vision object 10*d* at the position Py that is more distant from the user than the position Px. In addition, as shown in FIG. 3, the display control unit 104 makes the stereoscopic vision object 10*d* larger than the stereoscopic vision object 10D at the position Px.

(Third Range)

In the third range, control based on the correspondence relation with respect to the presence or absence of control between the first control and the second control is performed. Specifically, the correspondence relation is a relation in which one of a change in the position in the depth direction with respect to the reference position with the first control and a change in the state with respect to the state of the stereoscopic vision object at the reference position with the second control is made, and the other is not made. Note that the third range includes a range (close range) closer to the user in the depth direction than the first range and a range (distant range) more distant from the user in the depth direction than the first range. Hereinafter, the display control processing based on the correspondence relation in the third range will be described in detail. Note that the description of processing that is substantially the same as the processing based on the correlation described above is omitted.

(Third Range: Close Range)

Figure 4:
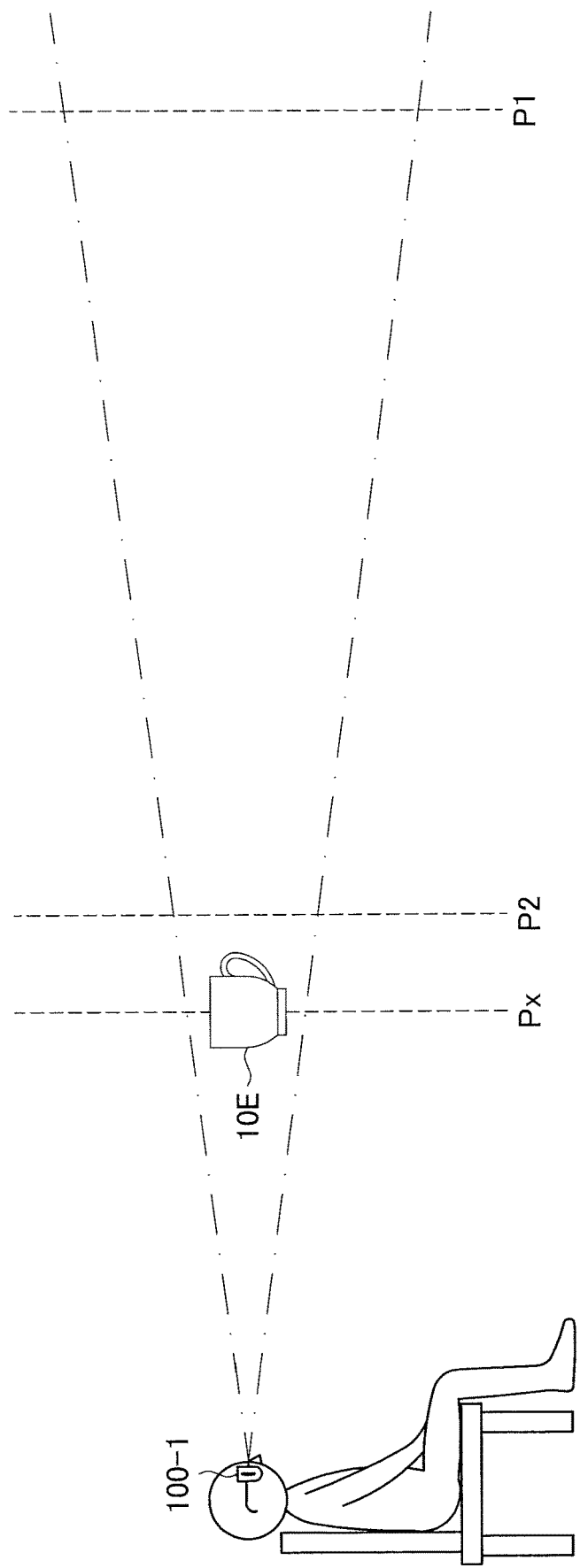
FIG. 4 is a diagram for describing an example of the display control processing of the stereoscopic vision object according to a first correspondence relation in the information processing device according to the embodiment.

The display control unit 104 performs the first control and the second control according to the first correspondence relation in the close range of the third range. The first correspondence relation is a relation in which a change in a position in the depth direction with respect to the reference position with the first control is made and a change in a state with respect to the state of the stereoscopic vision object at the reference position with the second control is not made. With reference to FIG. 4, an example of display control processing of the stereoscopic vision object according to the first correspondence relation will be described in detail. FIG. 4 is a diagram for describing an example of display control processing of the stereoscopic vision object according to the first correspondence relation in the information processing device 100-1 according to the present embodiment.

First, the display control unit 104 decides whether the reference position is closer to the user than the second position. For example, the display control unit 104 decides whether the position Px of a perceived stereoscopic vision object 10E is closer to the user than a position P2 as shown in FIG. 4. Note that the second position can be a position, for example, 0.5 to 1 meter away from the user in the depth direction. Needless to say, since the second position suitable for a variety of factors can vary as in the first position, the distance from the user to the second position in the depth direction may be shorter or longer than the exemplified length.

In a case where it is decided that the reference position is closer than the second position, the display control unit 104 determines the control amount of the first control on the basis of the reference position. For example, the display control unit 104 determines the amount of the first control so that the stereoscopic vision object is perceived at the reference position by the first control alone. In this case, the display control unit 104 does not perform the second control. Note that the display control unit 104 may make the amount of the second control zero, so that a change in a state with respect to the state of the stereoscopic vision object at the reference position with the second control is not made.

Next, the display control unit 104 performs the first control on the basis of the determined control amount. For example, the display control unit 104 controls the parallax amount of the image for stereoscopic vision, that is, the left eye image and the right eye image, so that the position in the depth direction is the reference position, thereby making the user perceive the stereoscopic vision object 10E at the position Px as shown in FIG. 4.

(Third Range: Distant Range)

Figure 5:
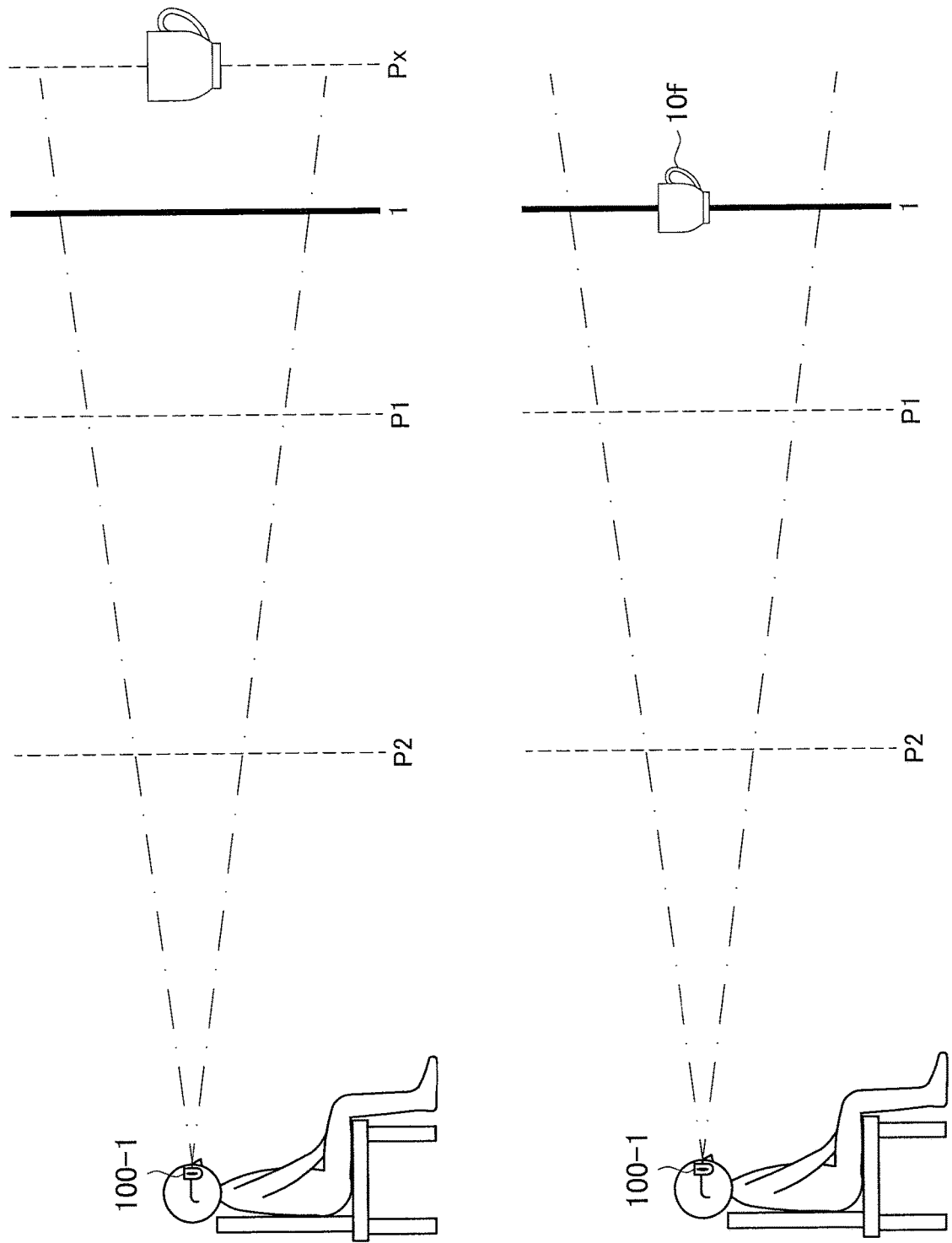
FIG. 5 is a diagram for describing an example of the display control processing of the stereoscopic vision object according to a second correspondence relation in the information processing device according to the embodiment.

The display control unit 104 performs the first control and the second control according to the second correspondence relation in the distant range of the third range. The second correspondence relation is a relation in which a change in a state with respect to the state of the stereoscopic vision object at the reference position with the second control is made, and a change in a position in the depth direction with respect to the reference position with the first control is not made. With reference to FIG. 5, an example of display control processing of the stereoscopic vision object according to the second correspondence relation will be described in detail. FIG. 5 is a diagram for describing an example of display control processing of the stereoscopic vision object according to the second correspondence relation in the information processing device 100-1 according to the present embodiment.

First, the display control unit 104 decides whether the reference position is more distant from the user than the third position. For example, the display control unit 104 decides whether the position Px of a perceived stereoscopic vision object 10F is closer to the user than the virtual screen 1 as shown in the upper part of FIG. 5. Note that, needless to say, the third position may be a position different from the position of the virtual screen 1.

In a case where it is decided that the reference position is more distant than the third position, the display control unit 104 determines the control amount of the second control on the basis of the reference position. For example, the display control unit 104 determines the amount of the second control so that the stereoscopic vision object is perceived at the reference position by the second control alone. In this case, the display control unit 104 does not perform the first control. Note that the display control unit 104 makes the amount of the first control zero, so that a change in a position in the depth direction with respect to the reference position with the first control may not be made.

Next, the display control unit 104 performs the second control on the basis of the determined control amount. For example, the display control unit 104 scales the stereoscopic vision object down like a stereoscopic vision object 10f as shown in the lower part of FIG. 5, thereby making the user perceive the stereoscopic vision object as if the stereoscopic vision object 10E was present at the position Px as shown in the upper part of FIG. 5.

((Determination of Control State))

The states of the first control and the second control are also determined by information regarding a perception of the depth (hereinafter also referred to as depth perception information). The display control unit 104 performs determination processing of the states of the first control and the second control as described below on the basis of the depth perception information.

First, the display control unit 104 determines the above relation between the first control and the second control on the basis of the depth perception information.

In addition, the display control unit 104 determines the first range and the second range on the basis of the depth perception information. Specifically, the display control unit 104 determines the above first position on the basis of the depth perception information.

In addition, the display control unit 104 adjusts the control amounts of the first control and the second control on the basis of the depth perception information. Specifically, the display control unit 104 changes, on the basis of the depth perception information, the control amounts determined by the display control based on the relation in each of the above ranges.

Here, the depth perception information includes information regarding the stereoscopic vision object. Specifically, the information regarding the stereoscopic vision object includes information regarding features of the stereoscopic vision object. More specifically, the features of the stereoscopic vision object are types of the stereoscopic vision object, and in a case where the type of the stereoscopic vision object is a predefined type, the display control unit 104 selects the relation corresponding to the type. For example, in a case where the stereoscopic vision object is a character or a figure, the display control unit 104 selects the above second correspondence relation and performs the second control, that is, the control of the state of the stereoscopic vision object alone.

Types of stereoscopic vision objects include types of content such as characters (sentences), figures, symbols or photographs, types of changes in display of content such as still images or moving images, types of the object in terms of whether the object relating to the stereoscopic vision object is an object that is actually present (including a similar object), or the like. In particular, in a case where the stereoscopic vision object is an object whose size is easily perceived among objects actually existing, such as a can, a plastic bottle, a coin or a writing utensil, which is often touched by the hand, the display control unit 104 reduces the first range, suppresses the amount of the second control in the control based on the first relation, or selects the first correspondence relation.

In addition, the features of the stereoscopic vision object include resolution, frame rate, material, significance level, presence or absence of continuous display, or the like of the stereoscopic vision object, in addition to the type of the stereoscopic vision object.

In addition, the information regarding the stereoscopic vision object includes information regarding the visual state of the stereoscopic vision object, in addition to the information regarding features of the stereoscopic vision object. For example, the visual state of the stereoscopic vision object includes a color, luminance, shade, density, movement speed or the like of the stereoscopic vision object.

Note that in a case where the depth perception information does not satisfy the predefined condition, the display control unit 104 performs the first control and the second control based on the above relation.

<1-3. Processing by Device>

Figure 6:
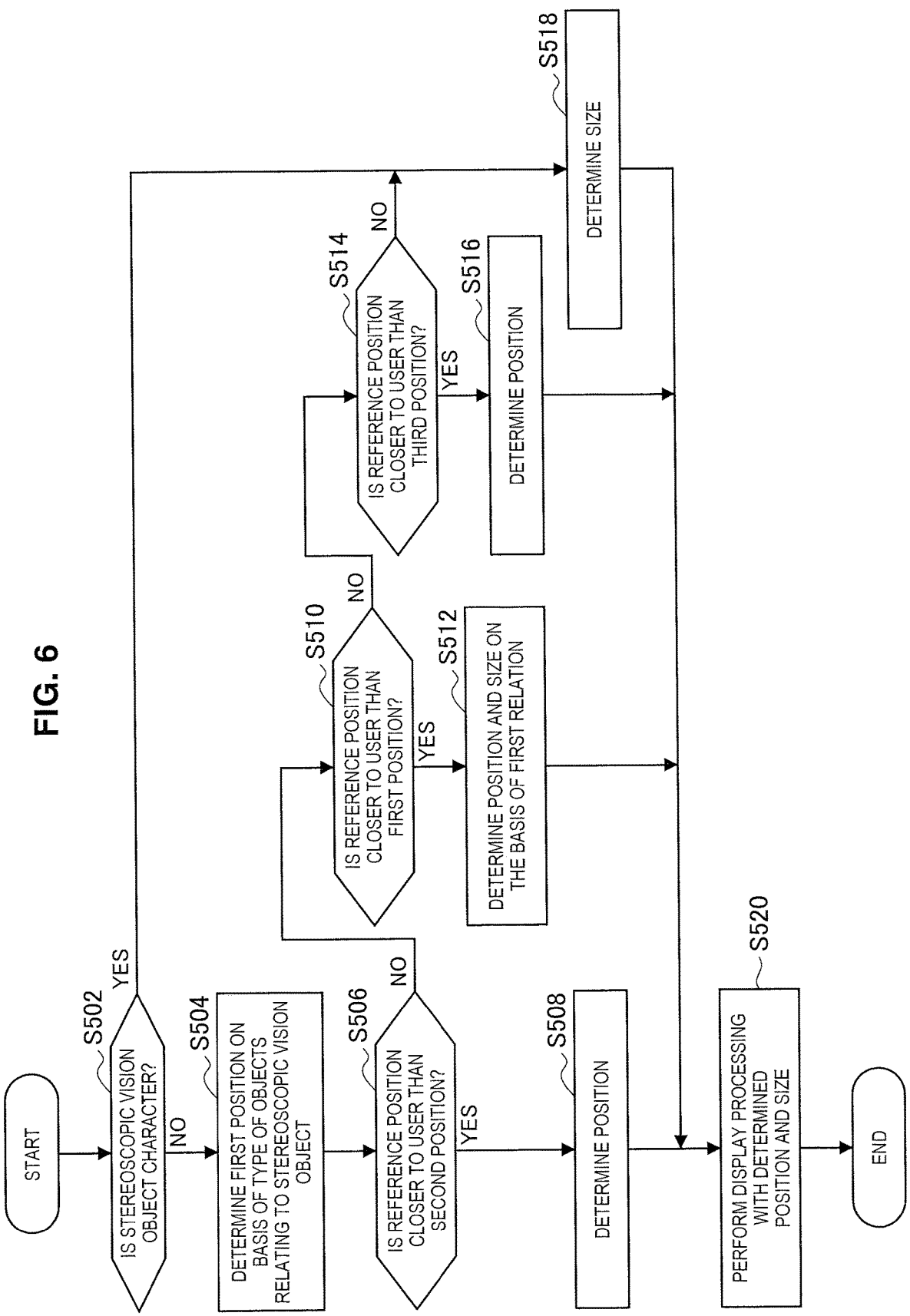
FIG. 6 is a flowchart conceptually showing processing by the information processing device according to the embodiment.

Next, processing by the information processing device 100-1 according to the present embodiment will be described with reference to FIG. 6. FIG. 6 is a flowchart conceptually showing processing by the information processing device 100-1 according to the present embodiment. Note that the description of processing that is substantially the same as the processing described above will be omitted.

First, the information processing device 100-1 decides whether the stereoscopic vision object is a character (step S502). Specifically, the display control unit 104 decides whether the stereoscopic vision object is the character on the basis of information indicating the content of the image for stereoscopic vision relating to the stereoscopic vision object.

When it is decided that the stereoscopic vision object is not the character, the information processing device 100-1 determines the first position on the basis of the type of objects relating to the stereoscopic vision object (step S504). Specifically, the display control unit 104 determines the first position on the basis of whether the object relating to the stereoscopic vision object actually exists. For example, in a case where the object actually exists, the display control unit 104 brings the first position closer to the user.

Next, the information processing device 100-1 decides whether the reference position is closer to the user than the second position (step S506). Specifically, the display control unit 104 performs the decision using the coordinate information of the reference position and the second position.

When it is decided that the reference position is closer to the user than the second position, the information processing device 100-1 determines the position in the depth direction (step S508). Specifically, the display control unit 104 determines, on the basis of the reference position, the position in the depth direction at which the stereoscopic vision object is arranged, that is, the parallax amount.

When it is decided that the reference position is not closer to the user than the second position, the information processing device 100-1 decides whether the reference position is closer to the user than the first position (step S510).

When it is decided that the reference position is closer to the user than the first position, the information processing device 100-1 determines the position in the depth direction and the size of the stereoscopic vision object on the basis of the first relation (step S512). Specifically, the display control unit 104 determines, as the position in the depth direction, a position more distant from the user than the reference position, and determines, as the size of the stereoscopic vision object, a size larger than the size at the reference position.

When it is decided that the reference position is not closer to the user than the first position, the information processing device 100-1 decides whether the reference position is closer to the user than the third position (step S514).

When it is decided that the reference position is closer to the user than the third position, the information processing device 100-1 determines the position in the depth direction (step S516). Note that the processing in this step is substantially the same as the processing in step S508.

In a case where it is decided that the reference position is not closer to the user than the third position, or in a case where in step S502 it is decided that the stereoscopic vision object is a character, the information processing device 100-1 determines the size of the stereoscopic vision object (step S518). Specifically, the display control unit 104 determines the size of the stereoscopic vision object on the basis of the reference position.

Next, the information processing device 100-1 performs display processing with the determined position in the depth direction and the determined size of the stereoscopic vision object (step S520). Specifically, the display control unit 104 causes the display unit 108 to display the stereoscopic vision object with the determined size at the determined position in the depth direction.

<1-4. Summary of First Embodiment>

As described above, according to the first embodiment of the present disclosure, the information processing device 100-1 performs the first control with respect to a position of the display object in the depth direction which is perceived by a user on the basis of an eye movement, and performs the second control with respect to a state of the display object which does not include the position in the depth direction as the state. As the first control and the second control, the information processing device 100-1 performs control based on the first relation in the first range in the depth direction, and performs control based on the second relation different from the first relation in the second range in the depth direction that is different from the first range. Hence, the first control and the second control are performed according to the relation that varies with the range in the depth direction, whereby, in the range in which the user is burdened, the first control can be suppressed, and the second control can be performed. As a result, it is possible to suppress the user's uncomfortable feeling while reducing the burden on the user.

In addition, the control based on the first relation includes control in which, with the first control, the amount relating to a change in a position with respect to the reference position in the depth direction at which the display object is perceived is smaller than the amount relating to a change in the position in the control based on the second relation, with the second control, the amount relating to a change in a state with respect to the state of the display object at the reference position is larger than the amount relating to a change in the state in the control based on the second relation. Hence, in the first range, the first control is suppressed and the second control is performed, whereby it is possible to not only reduce the burden on the user but also suppress the uncomfortable feeling of the user.

In addition, the first range includes a range closer to the user in the depth direction than the second range. Hence, in the range close to a user where the user is liable to be more burdened, the first control is suppressed, and the second control is performed, so that the burden on the user can be further reduced.

In addition, the first relation includes a correlation with respect to the control amounts between the first control and the second control. Hence, the position in the depth direction and the state of the display object are controlled in a correlated manner, whereby it is possible to effectively suppress the occurrence of the uncomfortable feeling of the user.

In addition, the correlation includes a relation in which the control amount of one of the first control and the second control is a control amount corresponding to a difference between the control amount of the other and the control amount of the other at the reference position. Hence, the first control and the second control are performed so that the display object is perceived at the reference position, whereby it is possible to further suppress the occurrence of the uncomfortable feeling of the user.

In addition, as the first control and the second control, the information processing device 100-1 performs control based on the correspondence relation with respect to the presence or absence of control between the first control and the second control in the third range in the depth direction that is different from the first range. Hence, depending on the range in the depth direction, both the first control and the second control may be performed, which may cause an uncomfortable feeling of the user or a burden on the user. However, these problems can be prevented.

In addition, the correspondence relation includes a relation in which one of the change in the position in the depth direction with respect to the reference position with the first control and the change in the state with respect to the state of the stereoscopic vision object at the reference position with the second control is made, and the other is not made. Hence, with only one of the first control and the second control, control relating to a change with respect to the reference position is performed, whereby it is possible to prevent the burden on the user or the occurrence of an uncomfortable feeling of the user due to control with the other.

In addition, the correspondence relation includes the first correspondence relation in which a change in a position in the depth direction with respect to the reference position with the first control is made, and a change in a state with respect to the state of the stereoscopic vision object at the reference position with the second control is not made, and the third range includes a range closer to the user in the depth direction than the first range. In the third range, the information processing device 100-1 performs the first control and the second control based on the first correspondence relation. Here, when the display object comes close to the user to some extent, the user has a sharper perception about the state, for example, the size of the display object. In view of this, in the present configuration, in a case where the reference position is closer to the user than the position where the user has a sharper perception of the state of the display object, a change in a state with respect to the state of the stereoscopic vision object at the reference position with the second control is not made, whereby it is possible to prevent the occurrence of the uncomfortable feeling of the user due to the second control.

In addition, the correspondence relation includes the second correspondence relation in which a change in a state with respect to the state of the stereoscopic vision object at the reference position with the second control is made, and a change in the position in the depth direction with respect to the reference position with the first control is not made, and the third range includes a range more distant from the user in the depth direction than the first range. In the third range, the information processing device 100-1 performs the first control and the second control based on the second correspondence relation. Here, when the display object moves away from the user to some extent, the user has a duller perception about the position of the display object in the depth direction. In view of this, in the present configuration, in a case where the reference position is more distant from the user than the position where the user has a duller perception about the position of the display object in the depth direction, the change in the position in the depth direction with respect to the reference position with the first control is not made, whereby it is possible to prevent the occurrence of the burden on the user due to the first control.

In addition, control of states of the display object includes control of the size of the display object. Hence, the size of the display object, which is a clue for the user to perceive the depth, is controlled, whereby it is possible to reduce the possibility that the user has an uncomfortable feeling due to the second control.

In addition, the display object includes a stereoscopic vision object, and the first control includes control of parallax of the left eye image and the right eye image relating to the stereoscopic vision object. Hence, the above configuration is applied to the stereoscopic vision object that is likely to give the burden on the user who visually recognizes the display object, whereby the effect of a greater reduction in the burden on the user can be achieved.

In addition, the information processing device 100-1 determines states of the first control and the second control on the basis of the depth perception information regarding the depth perception of the user. Hence, states of the first control and the second control are further judged according to the user's sense of depth (depth perception), whereby it is possible to reduce the burden and suppress the uncomfortable feeling so as to be more suitable for situations.

In addition, the information processing device 100-1 determines the first range and the second range on the basis of the depth perception information. Hence, the ranges alone are controlled, whereby it is possible to reduce the burden and suppress the uncomfortable feeling so as to be more suitable for situations while suppressing the complication of the processing.

In addition, the depth perception information includes information regarding the features of the display object or information regarding the visual state of the display object. Hence, the states of the first control and the second control are determined on the basis of the information that is likely to directly affect the user's sense of depth (depth perception), whereby it is possible to more effectively suppress the occurrence of the uncomfortable feeling of the user.

In addition, the information processing device 100-1 includes an information processing device mounted on the head of the user. Hence, the display that is performed near the user makes it possible to give the user a realistic feeling about the display.

<1-5. Modification>

The first embodiment of the present disclosure has been described above. Note that that the present embodiment is not limited to the above example. A modification of the present embodiment will be described below.

As the modification of the present embodiment, the information processing device 100-1 may perform the first control and the second control so that the positions of two or more stereoscopic vision objects in the depth direction fall within the predetermined range. Specifically, the display control unit 104 performs the first control and the second control according to the above correlation of at least one of the first stereoscopic vision object and the second stereoscopic vision object so that the respective positions of the first stereoscopic vision object and the second stereoscopic vision object in the depth direction fall within the predetermined range.

(Control Between Display Objects Displayed at the Same Timing)

Figure 7:
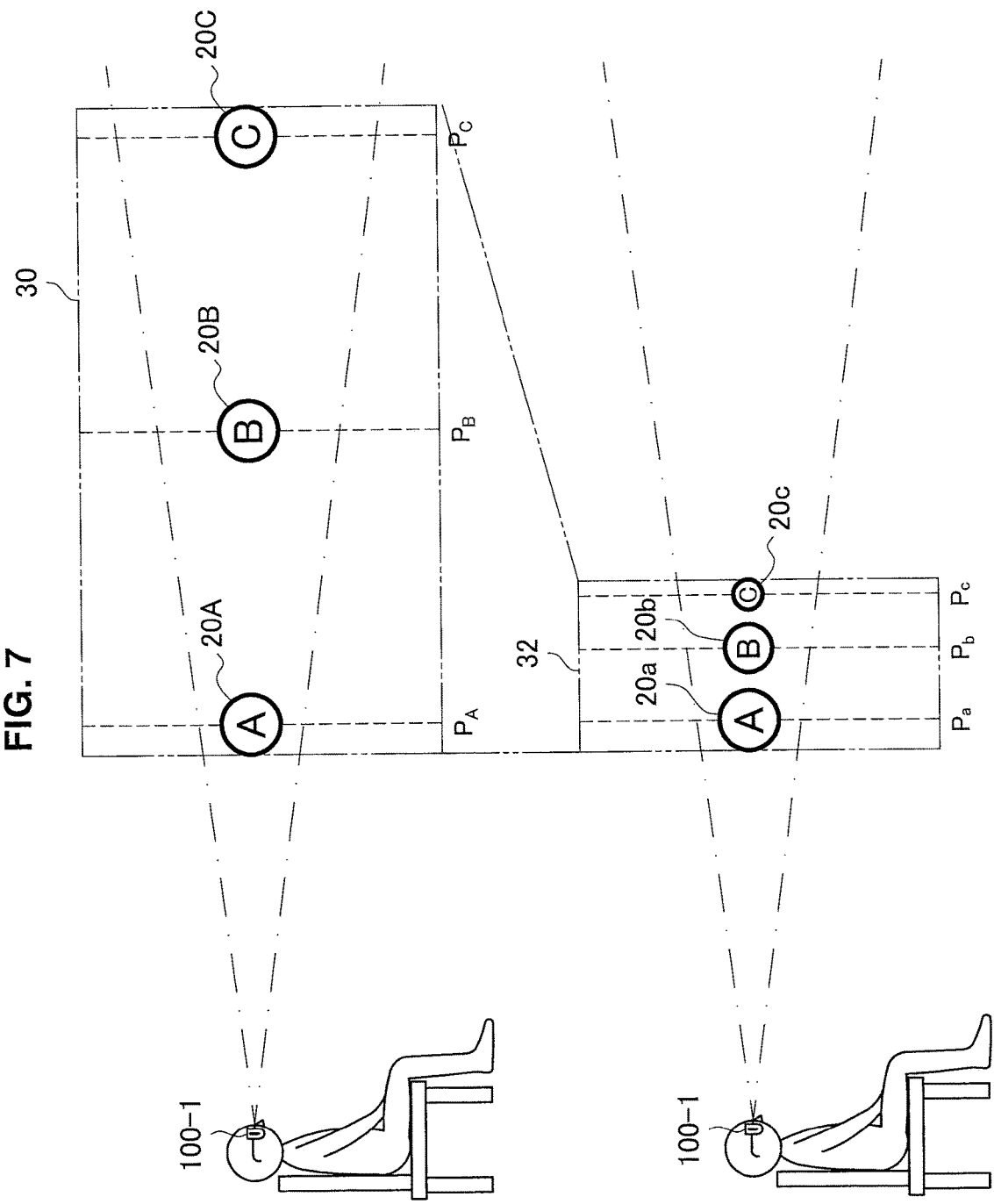
FIG. 7 is a diagram for describing an example of the display control processing of the stereoscopic vision object in the information processing device according to a modification of the embodiment.

For example, the second stereoscopic vision object is displayed at the same timing as the timing of the first stereoscopic vision object. Further, with reference to FIG. 7, an example of processing of the present modification will be described in detail. FIG. 7 is a diagram for describing an example of display control processing of the stereoscopic vision object in the information processing device 100-1 according to the modification of the present embodiment.

In a case where a plurality of stereoscopic vision objects are displayed at the same timing, the display control unit 104 calculates the distance between the reference positions of the plurality of stereoscopic vision objects. In a case where, for example, each of a plurality of stereoscopic vision objects 20A to 20C as shown in the upper part of FIG. 7 is scheduled to be displayed, the display control unit 104 calculates respective distances between reference positions $P_A$ to $P_C$ of the stereoscopic vision objects 20A to 20C.

Next, the display control unit 104 decides whether the respective calculated distances between the reference positions are equal to or greater than the threshold value. For example, the display control unit 104 decides whether the respective calculated distances between the reference positions $P_A$ to $P_C$ are equal to or greater than the threshold value. Note that the threshold value may be set by the user or may be a predefined fixed value.

In a case where it is decided that the respective calculated distances between the reference positions are equal to or greater than the threshold value, the display control unit 104 compresses, in the depth direction, the space including the plurality of stereoscopic vision objects, Specifically, the display control unit 104 performs, with respect to stereoscopic vision objects other than the stereoscopic vision object that is a reference (hereinafter also referred to as reference stereoscopic vision object), the first control and the second control according to the correlation on the basis of the reference position of the reference stereoscopic vision object. For example, in a case where it is decided that at least one of the distances between the reference positions $P_A$ to $P_C$ is equal to or greater than the threshold value, the display control unit 104 selects one of the stereoscopic vision objects 20A to 20C, for example, the stereoscopic vision object 20A as the reference stereoscopic vision object. Next, with respect to the stereoscopic vision objects 20B and 20C other than the selected stereoscopic vision object 20A, the display control unit 104 determines positions $P_b$ and $P_c$ in the depth direction so that a space 30 as shown in the upper part of FIG. 7 is compressed in the depth direction into a space 32 as shown in the lower part. In addition, the display control unit 104 determines the respective sizes of the stereoscopic vision objects according to the determined positions $P_b$ and $P_c$ in the depth direction. The display control unit 104 arranges stereoscopic vision objects 20b and 20c as shown in the lower part of FIG. 7 with the determined sizes at the determined positions $P_b$ and $P_c$ in the depth direction, and arranges a stereoscopic vision objects 20a at a reference position $P_a$ without changing its size.

Note that the reference stereoscopic vision object can be selected on the basis of the observation distance. For example, a stereoscopic vision object whose observation distance is shorter than those of any other stereoscopic vision objects is selected as the reference stereoscopic vision object. In this case, the control relating to the change with respect to the reference position with the first control and the second control is not performed with respect to the stereoscopic vision object closer to the user than any other stereoscopic vision objects, whereby it is possible to suppress the occurrence of an uncomfortable feeling of the user due to processing of the present modification.

In addition, in the above description, the first control and the second control based on the predetermined relation are performed with respect to the stereoscopic vision objects other than the reference stereoscopic vision object. The first control and the second control may be performed with respect to all of the plurality of stereoscopic vision objects.

(Control Between Display Objects Displayed at Different Timings)

Figure 8:
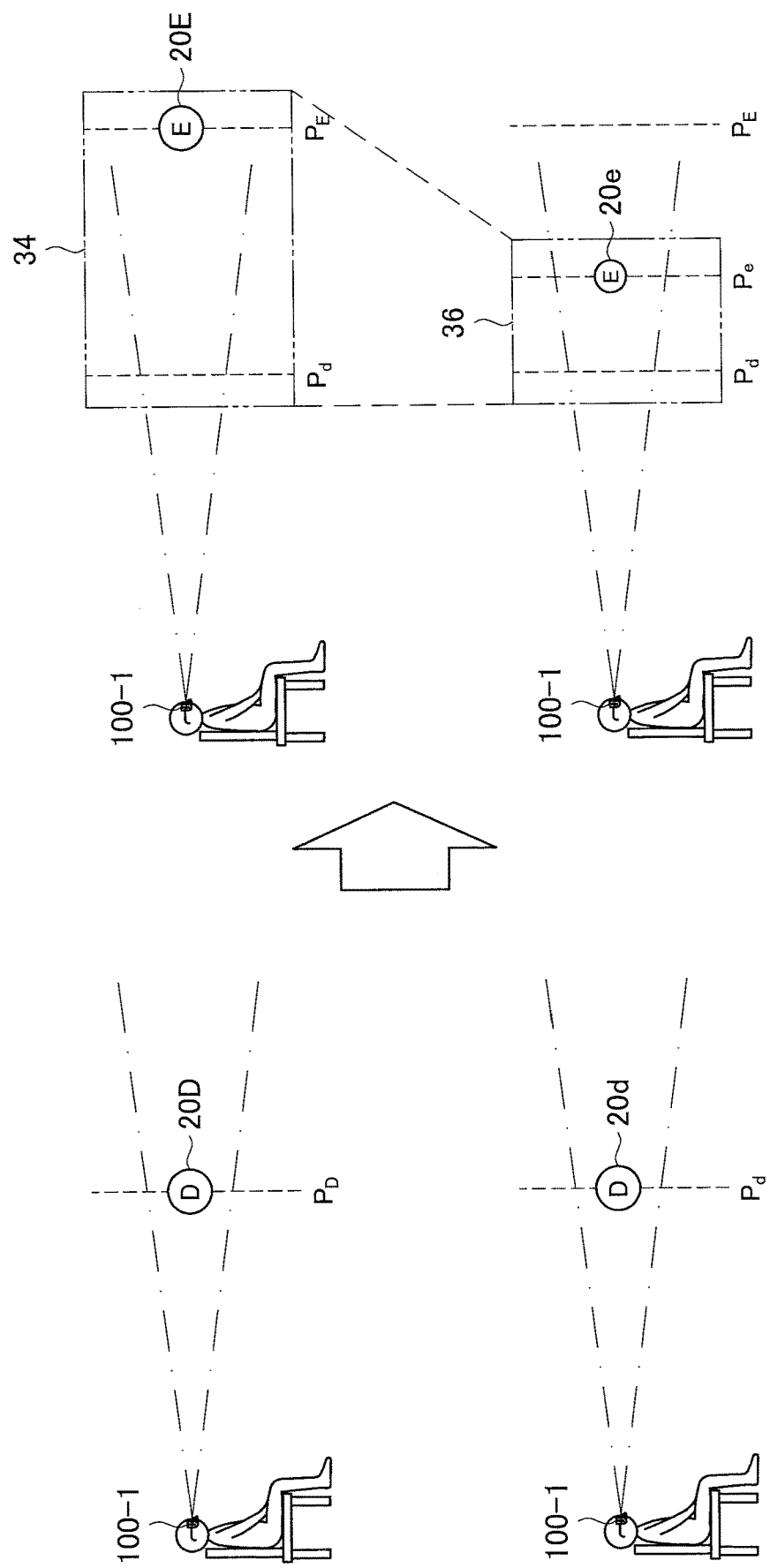
FIG. 8 is a diagram for describing another example of the display control processing of the stereoscopic vision object in the information processing device according to the modification of the embodiment.

While, in the above description, the example is described in which the stereoscopic vision objects displayed at the same timing are caused to come closer to each other in the depth direction, the stereoscopic vision objects displayed at the different timings may be caused to come closer to each other in the depth direction. Specifically, the above second stereoscopic vision object is displayed at a timing near the timing at which the first stereoscopic vision object is displayed. Further, another example of the processing of the present modification will be described in detail with reference to FIG. 8. FIG. 8 is a diagram for describing another example of the display control processing of the stereoscopic vision object in the information processing device 100-1 according to the modification of the present embodiment.

First, the display control unit 104 causes the display unit 108 to display the stereoscopic vision object at a certain time. For example, without performing the second control, the display control unit 104 performs the first control so that the stereoscopic vision object 20D is perceived at a reference position $P_D$ as shown in the upper left part of FIG. 8, thereby arranging a stereoscopic vision object 20D. Hence, a position $P_d$ of a perceived stereoscopic vision object 20d corresponds to the reference position $P_D$.

Next, when the display of the stereoscopic vision object is switched, the display control unit 104 calculates a distance in the depth direction between the stereoscopic vision object to be displayed at the next time (hereinafter also referred to as next time stereoscopic vision object) and the stereoscopic vision object which has been displayed at the previous time (hereinafter also referred to as previous time stereoscopic vision object). For example, when a stereoscopic vision object 20E as shown in the upper right part of FIG. 8 is scheduled to be displayed at the next time, the display control unit 104 calculates the distance between a position $P_d$ of a previous time stereoscopic vision object 20D in the depth direction and a reference position PE of a stereoscopic vision object 20E.

Next, the display control unit 104 decides whether the calculated distance in the depth direction is equal to or greater than the threshold value. For example, the display control unit 104 decides whether the distance between the position $P_D$ in the depth direction and the reference position $P_E$ is equal to or greater than the threshold value.

In a case where it is decided that the calculated distance in the depth direction is equal to or greater than the threshold value, the display control unit 104 compresses, in the depth direction, the space including the next time stereoscopic vision object. Specifically, the display control unit 104 performs the first control and the second control according to the correlation with respect to the next time stereoscopic vision object on the basis of the position of the previous time stereoscopic vision object in the depth direction. For example, in a case where it is decided that the distance between the position $P_d$ and the reference position $P_E$ is equal to or greater than the threshold value, the display control unit 104 determine a position $P_e$ in the depth direction so that with respect to the next time stereoscopic vision object 20E, a space 34 as shown in the upper right part of FIG. 8 is compressed in the depth direction into a space 36 as shown in the lower right part. In addition, the display control unit 104 determines the size of the stereoscopic vision object according to the determined position $P_e$ to be determined in the depth direction. Then, the display control unit 104 causes the display unit 108 to display a stereoscopic vision object 20e as shown in the lower right part of FIG. 8 with the size of the stereoscopic vision object at the determined position $P_e$ in the depth direction.

As described above, according to the modification of the present embodiment, the information processing device 100-1 performs the first control and the second control according to the correlation with respect to at least one of the first stereoscopic vision object and the second stereoscopic vision object so that the position of each of the first stereoscopic vision object and the second stereoscopic vision object in the depth direction falls within the predetermined range. Hence, the positions of respective display objects in the depth direction are placed close to each other, thereby reducing the operation of the eyes such as adjustment of the convergence angle of the user who visually recognizes both the first and second display objects, alleviating the burden on the user.

In addition, the second display object includes other display objects displayed at the same timing as the timing of the first display object. Hence, in a case where a plurality of display objects are displayed at the same timing, the amount of accommodation of the eye for visually recognizing each of the display objects is reduced, whereby it is possible to reduce the burden on the user.

In addition, the second stereoscopic vision object is displayed at a timing near the timing at which the first stereoscopic vision object is displayed. Hence, when the display of the display object is switched, the amount of accommodation of the eye before and after the switching is reduced, whereby it is possible to reduce the burden on the user.

2. Second Embodiment (Control Based on Predetermined Relation and User Information The information processing device 100-1 according to the first embodiment of the present disclosure has been described above. Subsequently, an information processing device 100-2 according to a second embodiment of the present disclosure will be described.

<2-1. Device Configuration>

Figure 9:
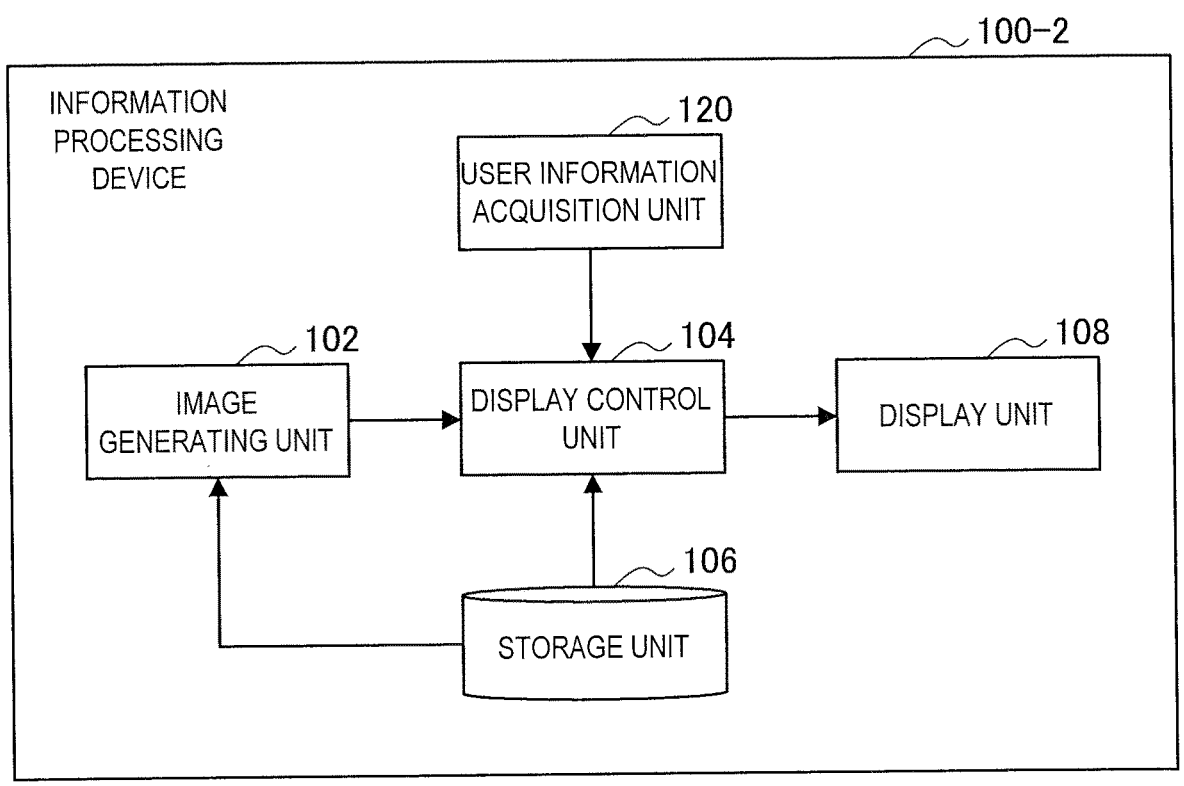
FIG. 9 is a block diagram showing an example of a schematic functional configuration of the information processing device according to a second embodiment of the present disclosure.

First, referring to FIG. 9, the functional configuration of the information processing device 100-2 according to the second embodiment of the present disclosure will be described. FIG. 9 is a block diagram showing an example of a schematic functional configuration of the information processing device 100-2 according to the second embodiment of the present disclosure.

As shown in FIG. 9, the information processing device 100-2 includes a user information acquisition unit 120 in addition to the image generating unit 102, the display control unit 104, the storage unit 106, and the display unit 108.

The user information acquisition unit 120 acquires information regarding the user of the information processing device 100-2. Specifically, the information regarding the user includes information regarding the state of the user. More specifically, the state of the user is behavior of the user. For example, the user's behavior includes behavior relating to movement such as walking, running or standing still, exercise such as tennis, swimming or stair climbing, use of moving means such as escalator or elevator, behavior estimated from the user's position such as watching movies at a movie theater or meals at a restaurant, or the like.

In addition, the state of the user includes a state of the user in addition to the behavior of the user. The state of the user, for example, includes an external state such as a posture, a line of sight, presence or absence of exercise, or exercise amount of the user, an internal state including internal body conditions (biological information) such as body temperature, perspiration or pulse of the user, and emotions estimated on the basis thereof, or the like. In particular, the posture of the user includes the presence or absence of looking down on the stereoscopic vision object or a looking down angle.

In addition, the information regarding the user includes information regarding the attribute of the user. For example, the attribute of the user includes the age, generation, sex, race, nationality, or the like of the user. In addition, the information regarding the user includes information regarding the features of the user. For example, the features of the user include sight and features of the face of the user. In addition, the information regarding the user includes user setting information, <2-2. Technical Features>

Next, the technical features of the information processing device 100-2 according to the present embodiment will be described. Note that the description of features that are substantially the same as the technical features in the first embodiment will be omitted.

(Determination of Control State)

The display control unit 104 determines the states of the first control and the second control on the basis of the information regarding the user. Specifically, the depth perception information includes information regarding the user acquired by the user information acquisition unit 120, and the display control unit 104 selects the relation between the first control and the second control corresponding to the behavior in a case where the behavior of the user is predefined behavior. For example, when the user's behavior is running, the display control unit 104 selects the above first correspondence relation and performs the first control, that is, the control of the position in the depth direction alone. This is because, in a case where the user is doing exercise, the motion parallax works, so that the user can have the sense of depth (depth perception) easily.

In addition, the display control unit 104 determines the first range and the second range on the basis of the information regarding the user. Specifically, the display control unit 104 determines the first position on the basis of the age of the user. For example, when the user's age is the age of a child, the display control unit 104 brings the first position closer to the user. This is because the child has a shorter pupillary distance than that of the adult, that is, the child has a small convergence angle, and a burden is hardly given to the child. Note that the first position may be determined on the basis of other information that changes according to the pupillary distance. In addition, the first position may be determined directly on the basis of the pupillary distance of the user.

Further, the display control unit 104 adjusts the control amounts of the first control and the second control on the basis of the information regarding the user. Specifically, when the behavior of the user is stationary, the display control unit 104 selects the correlation and adjusts, on the basis of the sight of the user, the amounts of the first control and the second control which are determined on the basis of the first relation. For example, in a case where the difference in sight between the left eye and the right eye of the user is equal to or greater than the threshold value, the display control unit 104 changes the position determined on the basis of the first relation to a position in a direction away from the user. This is because in a case where the difference in sight between the left eye and the right eye is large, stereoscopic vision is difficult as compared with a case where there is no difference in sight between the left eye and the right eye, and the burden on the user is likely to be large.

<2-3. Processing by Device>

Figure 10:
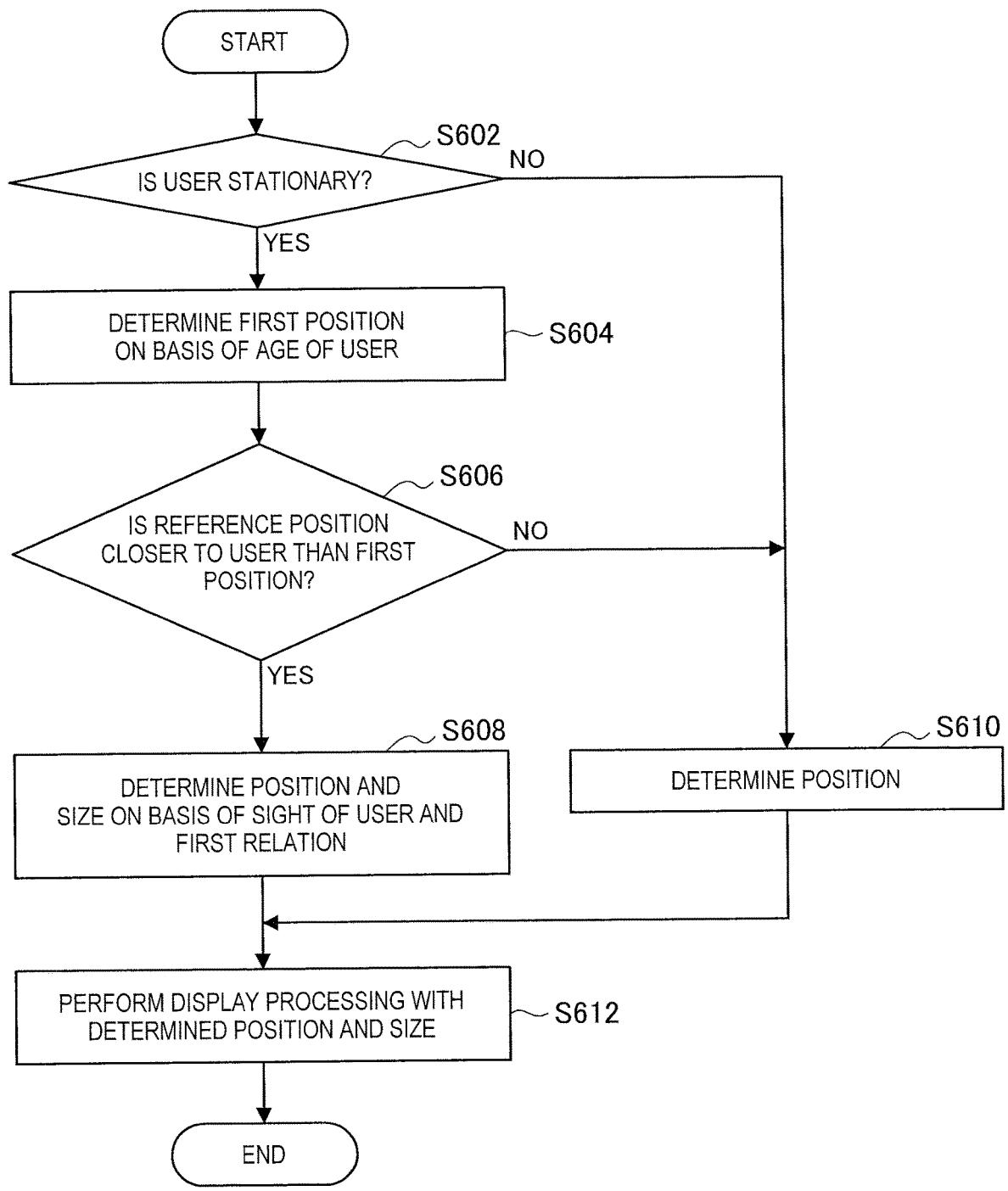
FIG. 10 is a flowchart conceptually showing processing by the information processing device according to the embodiment.

Next, with reference to FIG. 10, the processing by the information processing device 100-2 according to the present embodiment will be described. FIG. 10 is a flowchart conceptually showing processing by the information processing device 100-2 according to the present embodiment. Note that the description of processing that is substantially the same as the processing described above will be omitted.

First, the information processing device 100-2 decides whether the user is stationary (step S602). Specifically, the display control unit 104 decides whether information regarding the behavior of the user acquired by the user information acquisition unit 120 indicates that the user is stationary. Note that information for recognizing the behavior of the user (for example, acceleration information, position information, or the like) may be acquired by the user information acquisition unit 120. In that case, behavior of the user may be recognized by a behavior recognition unit that the information processing device 100-2 is separately provided with.

When it is decided that the user is stationary, the information processing device 100-2 determines the first position on the basis of the age of the user (step S604). Specifically, in a case where the age of the user indicated by the information regarding the attribute of the user acquired by the user information acquisition unit 120 is the age of a child, the display control unit 104 brings the first position closer to the user. In addition, in a case where the age of the user is the age of an adult, the display control unit 104 does not change the first position, or the display control unit 104 locates the first position away from the user. Note that instead of the age of the user, the first position may be determined on the basis of the pupillary distance of the user.

Next, the information processing device 100-2 decides whether the reference position is closer to the user than the first position (step S606).

When it is decided that the reference position is closer to the user than the first position, the information processing device 100-2 determines the position in the depth direction and the size of the stereoscopic vision object on the basis of the sight of the user and the first relation (Step S608). Specifically, in a case where the difference in sight between the left eye and the right eye of the user indicated by the information regarding the attribute of the user acquired by the user information acquisition unit 120 is equal to or greater than the threshold value, the display control unit 104 changes the position in the depth direction to a position more distant from the user than a position determined on the basis of the first relation. In addition, the display control unit 104 changes the size of the stereoscopic vision object to a size larger than the size determined on the basis of the first relation.

When it is decided in step S606 that the reference position is not close to the user than the first position, or when it is decided in step S602 that the user is not stationary, the information processing device 100-2 determines the position in the depth direction (step S610), Specifically, in a case where the behavior of the user is an exercise relating to a movement such as walking, or an exercise such as sports, the display control unit 104 selects the first correspondence relation and determines the position in the depth direction on the basis of the reference position.

Next, the information processing device 100-2 performs display processing with the determined position in the depth direction and the determined size of the stereoscopic vision object (step S612).

Note that in the above description, in a case where it is decided in step S602 that the user is not stationary, that is, the user is doing exercise, the first control alone is performed according to the first correspondence relation. In this case, the display control unit 104 may not perform the first control or the second control. This is because during exercise, from the viewpoint of safety, the user should be in a state where the user can pay attention to the surroundings, and it is desirable that the stereoscopic display that the user is likely to gaze at be stopped.

<2-4. Summary of Second Embodiment>

As described above, according to the second embodiment of the present disclosure, the depth perception information includes information regarding the attribute of the user or information regarding the state of the user. Hence, the states of the first control and the second control suitable for individual users are determined, whereby it is possible to reduce the burden and suppress the uncomfortable feeling according to the user.

3. Third Embodiment (Control Based on Predetermined Relation and User Surrounding Environment)

The information processing device 100-2 according to the second embodiment of the present disclosure has been described above. Subsequently, an information processing device 100-3 according to a third embodiment of the present disclosure will be described.

<3-1. Device Configuration>

Figure 11:
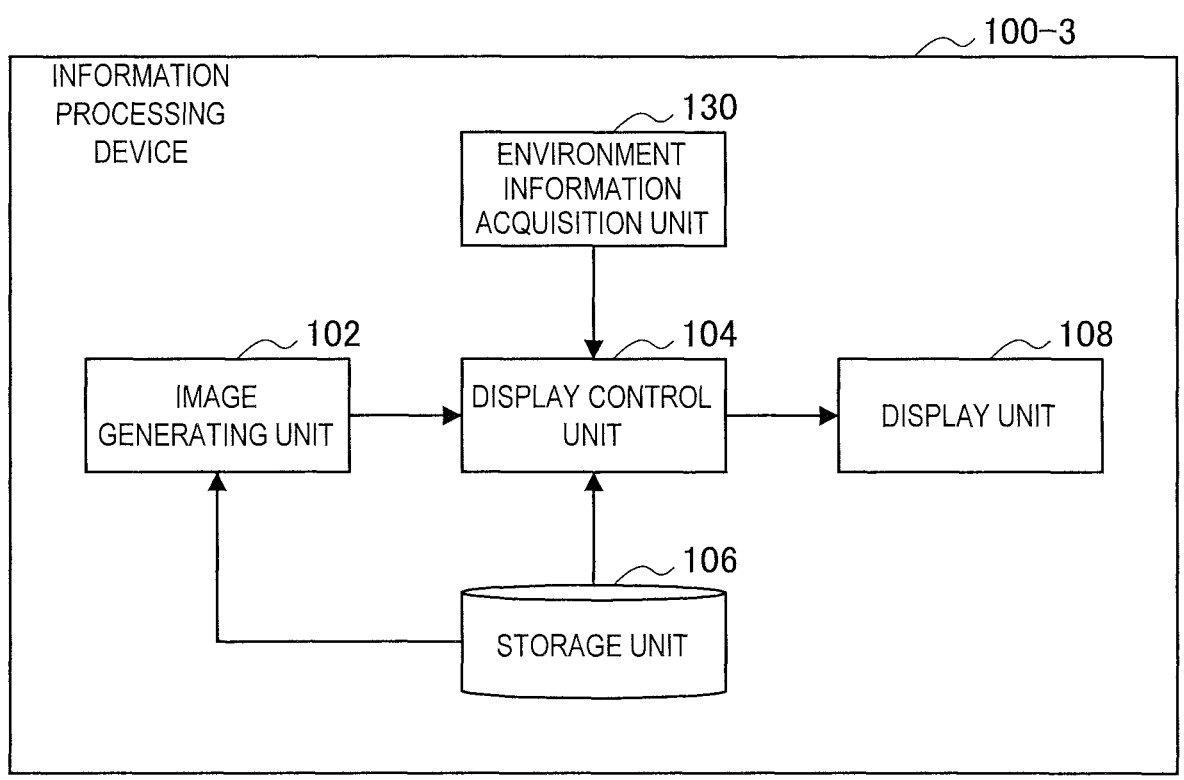
FIG. 11 is a block diagram showing an example of a schematic functional configuration of an information processing device according to a third embodiment of the present disclosure.

First, the functional configuration of the information processing device 100-3 according to the third embodiment of the present disclosure will be described with reference to FIG. 11. FIG. 11 is a block diagram showing an example of a schematic functional configuration of the information processing device 100-3 according to the third embodiment of the present disclosure.

As illustrated in FIG. 11, the information processing device 100-3 includes an environment information acquisition unit 130 in addition to the image generating unit 102, the display control unit 104, the storage unit 106, and the display unit 108.

The environment information acquisition unit 130 acquires information regarding the environment surrounding the user (hereinafter also referred to as environment information). Specifically, the environment information includes information regarding a visual state of a space (hereinafter also referred to as display space) in which a stereoscopic vision object is displayed. The visual state of the display space, for example, includes a non-physical state such as color or luminance of the display space or a physical state. The physical state includes presence or absence, number, arrangement, density, and movement of the object, their change, or the like. In particular, the arrangement of objects includes whether the objects are arranged at equal intervals in the depth direction.

In addition, the environment information includes information regarding the type of the display space. The type of the display space, for example, includes the type of the inside of a building such as a corridor or a room, the type in terms of the inside or the outside of a building such as an interior or an exterior, the type of medium such as air or water present in the display space, and the like.

<3-2. Technical Features>

The display control unit 104 determines the states of the first control and the second control on the basis of the environment information. Specifically, the depth perception information includes environment information acquired by the environment information acquisition unit 130, and in a case where the type of the display space indicated by the environment information is a predefined type, the display control unit 104 selects the relation between the first control and the second control corresponding to the state. For example, in a case where the display space is the outside of a building, the display control unit 104 selects the above first correspondence relation and performs the first control, that is, the control of the position in the depth direction alone. This is for reducing the burden on the user from the viewpoint of safety, and making the user less likely to suffer visually induced motion sickness, considering that vehicles such as bicycles or automobiles in addition to persons may pass outside a building.

In addition, the display control unit 104 determines the first range and the second range on the basis of the environment information. Specifically, the display control unit 104 determines the first position on the basis of the physical state of the display space. For example, in a case where an object is present in the display space, the display control unit 104 brings the first position closer to the user. This is because, in a case where, in addition to a stereoscopic vision object, the object, in particular, the object in the actual space exists, the user is more likely to perceive the depth, and the possibility will increase that the user has an uncomfortable feeling.

In addition, the display control unit 104 adjusts the control amounts of the first control and the second control on the basis of the environment information. Specifically, in a case where the display space is the inside of a building, the display control unit 104 selects the correlation, and adjusts the amount of the first control determined on the basis of the first relation on the basis of the luminance of the display space. For example, in a case where the luminance of the display space is equal to or greater than the threshold value, the display control unit 104 changes the position determined on the basis of the first relation to a position in a direction in which the position is brought closer to the user. This is because as the luminance of the display space, that is, the actual space over which the stereoscopic vision object is superimposed increases, the surrounding information that the user can grasp increases, and the user is more likely to have the sense of depth (depth perception).

<3-3. Processing by Device>

Figure 12:
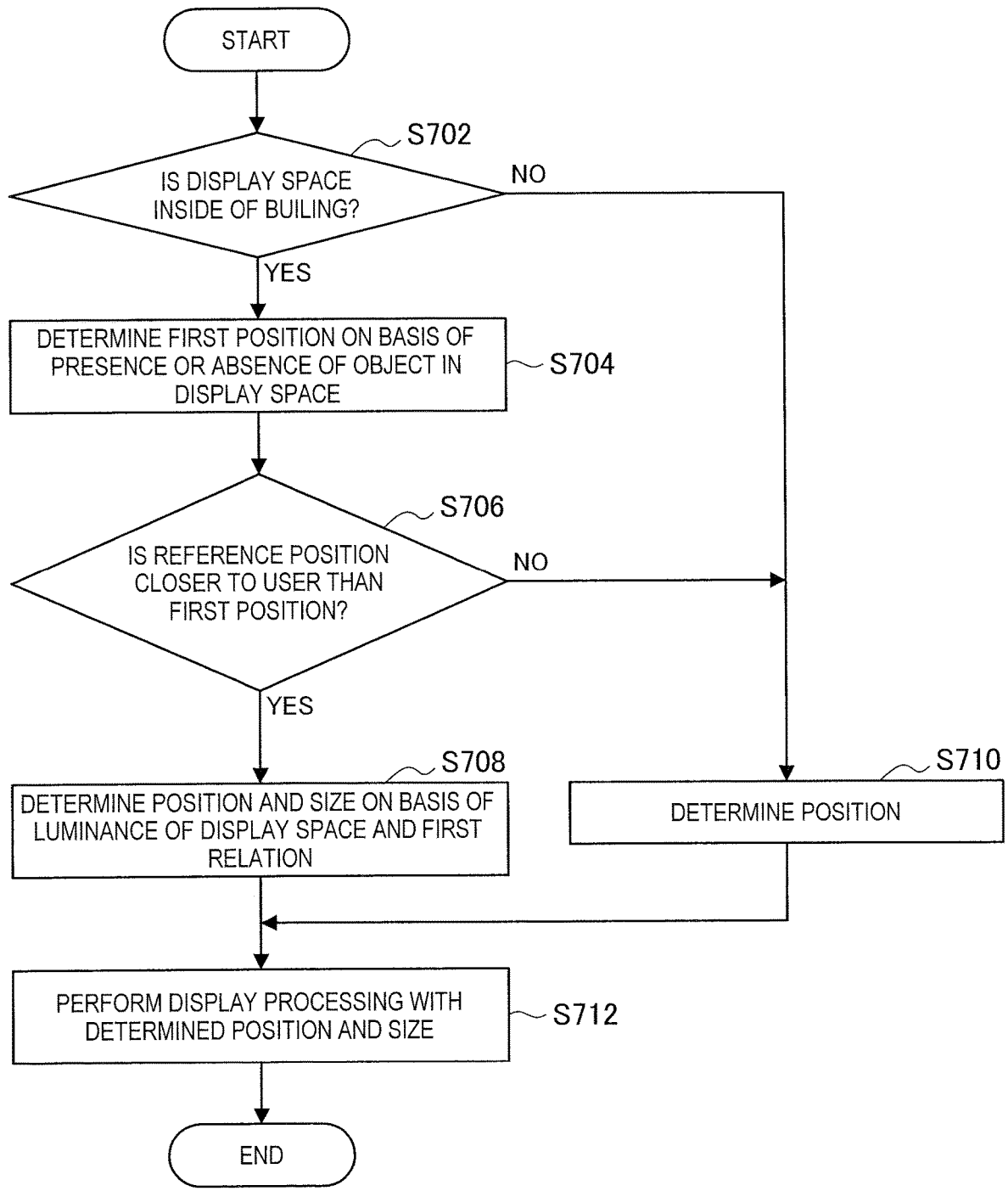
FIG. 12 is a flowchart conceptually showing processing by the information processing device according to the embodiment.

Next, the processing by the information processing device 100-3 according to the present embodiment will be described with reference to FIG. 12. FIG. 12 is a flowchart conceptually showing processing by the information processing device 100-3 according to the present embodiment. Note that the description of processing that is substantially the same as the processing described above will be omitted.

First, the information processing device 100-3 decides whether the display space is the inside of a building (step S702). Specifically, the display control unit 104 decides whether the information regarding the type of the display space acquired by the environment information acquisition unit 130 indicates the inside of the building.

When it is decided that the display space is the inside of the building, the information processing device 100-3 determines the first position on the basis of the presence or absence of the object in the display space (step S704). Specifically, in a case where the information regarding the object in the display space acquired by the environment information acquisition unit 130 indicates the presence of the object, the display control unit 104 brings the first position closer to the user.

Next, the information processing device 100-3 decides whether the reference position is closer to the user than the first position (step S706).

When it is decided that the reference position is closer to the user than the first position, the information processing device 100-3 determines the position in the depth direction and the size of the stereoscopic vision object on the basis of the luminance of the display space and the first relation (step S708). Specifically, in a case where the luminance of the display space indicated by the information regarding the visual state of the display space acquired by the environment information acquisition unit 130 is equal to or greater than the threshold value, the display control unit 104 changes the position in the depth direction to a position more distant from the user than a position determined on the basis of the first relation. In addition, the display control unit 104 changes the size of the stereoscopic vision object to a size larger than the size determined on the basis of the first relation.

When it is decided in step S706 that the reference position is not closer to the user than the first position, or when it is decided in step S702 that the display space is the outside of the building, the information processing device 100-3 determines the position in the depth direction (step S710). Specifically, in a case where the information regarding the type of the display space indicates the outside of the building, the display control unit 104 selects the first correspondence relation and determines the position in the depth direction on the basis of the reference position.

Next, the information processing device 100-3 performs display processing with the determined position in the depth direction and the determined size of the stereoscopic vision object (step S712).

<3-4. Summary of Third Embodiment>

As described above, according to the third embodiment of the present disclosure, the depth perception information includes environment information regarding the environment of the display space. Hence, the first control and the second control are performed according to the situation of the display destination of the stereoscopic vision object, whereby it is possible to prevent effect of reducing burden on users and suppressing the uncomfortable feeling from decreasing under the situation.

In addition, the environment information includes information regarding the visual state of the display space or information regarding the type of the display space. Hence, the amounts of the first control and the second control are adjusted according to the situation of the space visually recognized by the user, whereby it is possible to suppress the burden on users and the uncomfortable feeling so as to be suitable for the display space.

Note that in the above description, the example has been described in which the display space is the actual space. The display space may be a virtual space.

4. Hardware Configuration of Information Processing Device According to Embodiment of the Present Disclosure The information processing device 100 according to each embodiment of the present disclosure has been described above. The processing by the information processing device 100 described above is performed by the cooperation of software, and hardware of the information processing device 100 described below.

Figure 13:
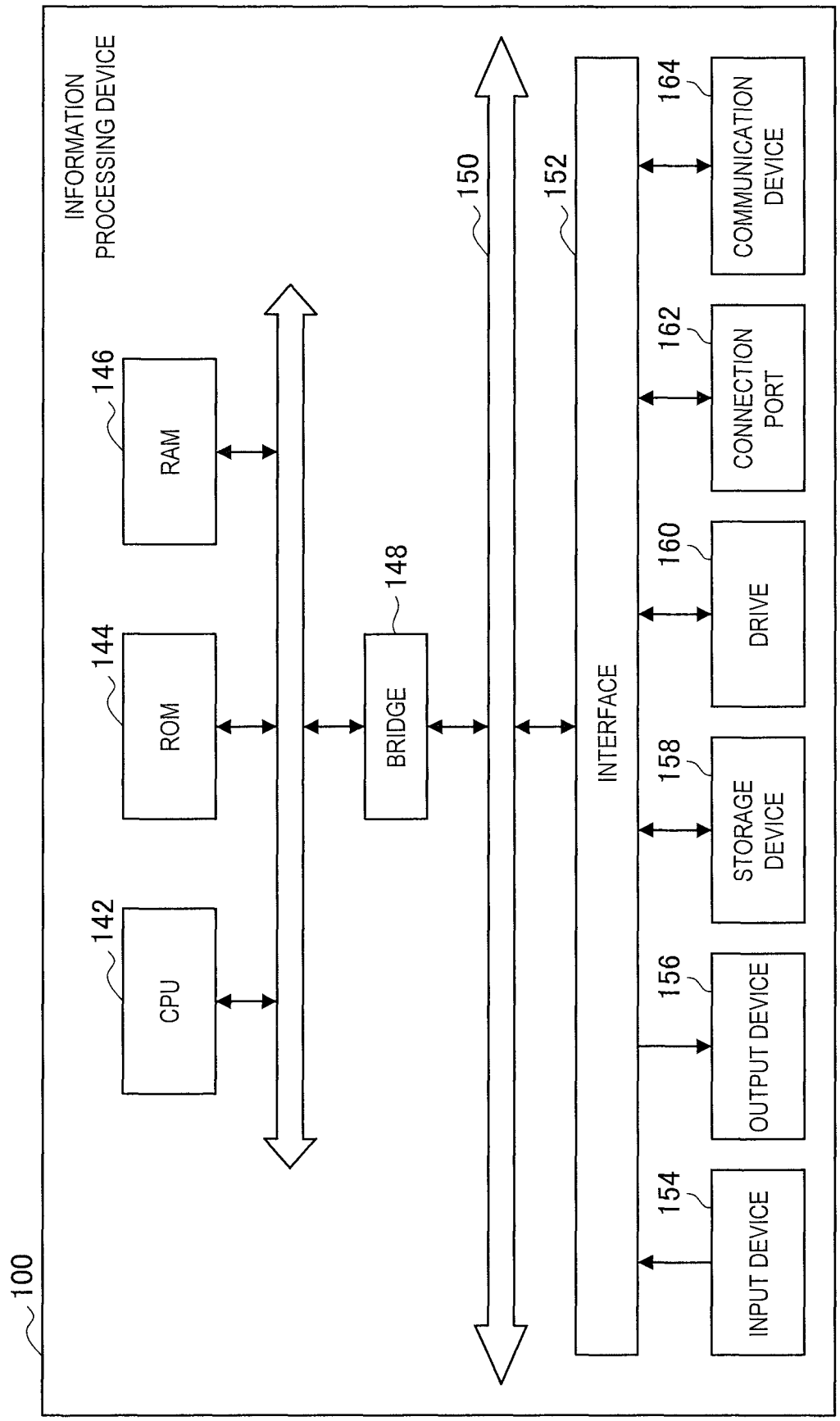
FIG. 13 is an explanatory diagram showing a hardware configuration of the information processing device according to an embodiment of the present disclosure.

FIG. 13 is an explanatory diagram showing the hardware configuration of the information processing device 100 according to an embodiment of the present disclosure. As shown in FIG. 13, the information processing device 100 includes a central processing unit (CPU) 142, a read only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing unit and cooperates with various programs to perform operations of the image generating unit 102 and the display control unit 104 in the information processing device 100. In addition, the CPU 142 may be a microprocessor. The ROM 144 stores programs, computation parameters, or the like to be used by the CPU 142. The RAM 146 temporarily stores programs to be used in the execution of the CPU 142, parameters or the like that appropriately change in the execution, or the like. Part of the storage unit 106 in the information processing device 100 includes the ROM 144 and the RAM 146. The CPU 142, the ROM 144, and the RAM 146 are connected to each other via an internal bus including a CPU bus or the like.

The input device 154 includes, for example, input means for a user to input information such as a mouse, a keyboard, a touch panel, a button, a microphone, a switch and a lever, an input control circuit that generates an input signal on the basis of an input by a user and outputs the input signal to the CPU 142, and the like. By operating the input device 154, the user of the information processing device 100 can input various data to the information processing device 100 and instruct the information processing device 100 about processing operations.

The output device 156 makes an output to a device such as a liquid crystal display (LCD) device, an organic light emitting diode (OLED) device, or a lamp as an example of the display unit 108 in the information processing device 100. Further, the output device 156 may make sound outputs of a speaker, a headphone, or the like.

The storage device 158 is a device for storing data. The storage device 158 may include a storage medium, a recording device that records data in the storage medium, a readout device that reads data from the storage medium, a deletion device that deletes data recorded in the storage medium, and the like. The storage device 158 stores programs executed by the CPU 142, and various data.

The drive 160 is a reader/writer for a storage medium, which is incorporated in or externally attached to the information processing device 100. The drive 160 reads information recorded in a magnetic disk, an optical disc, and a magneto-optical disk which are attached to the drive 160, or a removable storage medium such as a semiconductor memory, and outputs the information to the RAM 146, In addition, the drive 160 can also write information to the removable storage medium.

The connection port 162 is, for example, a bus for connecting to an information processing device or a peripheral device that is disposed outside the information processing device 100. In addition, the connection port 162 may be a universal serial bus (USB).

The communication device 164 is, for example, a communication interface including a communication device for connecting to a network. The communication device 164 may be an infrared communication compatible device, a wireless local area network (LAN) compatible communication device, a long term evolution (LTE) compatible communication device, or a wire communication device that performs wired communication.

5. Conclusion

As described above, according to the first embodiment of the present disclosure, the first control and the second control are performed according to the relation that varies with the range in the depth direction, whereby, in the range in which the user is burdened, the first control can be suppressed, and the second control can be performed. As a result, it is possible to suppress the user's uncomfortable feeling while reducing the burden on the user.

In addition, according to the second embodiment of the present disclosure, the states of the first control and the second control suitable for individual users are determined, whereby it is possible to reduce the burden and suppress the uncomfortable feeling according to the user.

In addition, according to the third embodiment of the present disclosure, the first control and the second control are performed according to the situation of the display destination of the stereoscopic vision object, whereby it is possible to prevent the effect of reducing the burden on the user and suppressing the uncomfortable feeling from decreasing under the situation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the above embodiments, the display object is, for example, the stereoscopic vision object. The present technology is not limited to this example. The display object, for example, may be an image that is not stereoscopically viewed by the user. The display object, for example, is an image of a real image projected on the display screen, or an image of a virtual image projected on a place without a screen.

In the above embodiments, various depth perception information such as information regarding environment of the display object, user or display space has been described. The depth perception information may be other information. The depth perception information, for example, can be information regarding a display device, a display method or an application which displays the display object. The display device includes an HMD, a three dimensional (3D) television, a projector for 3D movies, and the like. In addition, the display method includes an optical see-through method, a video see-through method, a retinal projection method, or the like as described above. In addition, the application includes navigation, behavior tracking, browser, e-mail software, game (in particular, augmented reality (AR) game), or the like. For example, in a case where the application running on the information processing device 100 is navigation, the states of the first control and the second control can be determined depending on whether the navigation is in progress, that is, the user is moving.

In addition, in the above embodiments, the example has been described in which three types of determination processing with respect to the states of the first control and the second control are performed on the basis of the depth perception information. One or two of the three types of determination processing may be performed. The determination processing based on the depth perception information may not be performed.

In addition, in the above embodiments, the processing in which the number of the display objects is single has been mainly described. In a case where a plurality of display objects are present, the first control and the second control may be performed with respect to the display object specified on the basis of the line of sight of the user.

In addition, the information processing device 100 according to each embodiment of the present disclosure may be applied to the medical field, the aircraft field, the agriculture field, or the automobile field. In the medical field, with the information processing device 100, for example, a display object is superimposed on an X-ray photograph or a magnetic resonance imaging (MRI) image, or a display object is superimposed on a surgical video or a space of an operating room. In this case, according to the configuration of each embodiment of the present disclosure, the sense of uncomfortable feeling is suppressed while the burden on the surgeon or the like visually recognizing the display object is reduced, so that even in a case where the medical practice is performed for a long time, medical safety can be maintained.

In addition, in the aircraft field, for example, the information processing device 100 is applied to a simulated flight device. The simulated flight device displays to a trainee a virtual view image that would be visible from an aircraft's cockpit. In this case, according to the configuration of each embodiment of the present disclosure, the uncomfortable feeling of the trainee who visually recognizes the displayed view image is suppressed and the burden is reduced, whereby it is possible to practice training for a long period while maintaining the accuracy required for training.

In addition, in the agricultural field, for example, when paddy fields and fields are cultivated, the information processing device 100 displays a display object indicating the travel route of the cultivator. In this case, according to the configuration of each embodiment of the present disclosure, the uncomfortable feeling is suppressed while the burden on the farmer or the like visually recognizing the display object is reduced, so that the paddy fields and the fields are cultivated without the cultivator deviating from the traveling route, and work efficiency in agriculture can be improved.

In addition, in the automobile field, for example, the information processing device 100 displays a display object indicating a route to a destination. In this case, according to the configuration of each embodiment of the present disclosure, the uncomfortable feeling of a driver visually recognizing the display object is suppressed and the burden is reduced, so that the safety in driving for a long time can be improved.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a processing in which steps shown in the flowcharts of the above embodiments are performed in a time-series manner in accordance with a described sequence but also a processing in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)

An information processing device including:

a first display control unit configured to perform first control with respect to a position of a display object in a depth direction, the position being perceived by a user on a basis of an eye movement; and a second display control unit configured to perform second control with respect to a state of the display object, the state not including the position in the depth direction as a state, in which the first display control unit and the second display control unit perform control based on a first relation in a first range in the depth direction, and perform control based on a second relation in a second range in the depth direction, the second relation being different from the first relation, the second range being different from the first range.

(2)

The information processing device according to (1), in which the control based on the first relation includes control in which, with the first control, an amount relating to a change in a position with respect to a reference position in the depth direction at which the display object is perceived is smaller than an amount relating to a change in the position in the control based on the second relation, and with the second control, an amount relating to a change in a state at the reference position with respect to the state of the display object is larger than an amount relating to a change in the state in the control based on the second relation.

(3)

The information processing device according to (2), in which the first range includes a range closer to the user in the depth direction than the second range.

(4)

The information processing device according to (2) or (3), in which the first relation includes a correlation with respect to a control amount between the first control and the second control.

(5)

The information processing device according to (4), in which the correlation includes a relation in which a control amount of one of the first control and the second control is a control amount corresponding to a difference between a control amount of another and a control amount of the other at the reference position.

(6)

The information processing device according to (4) or (5), in which the first display control unit and the second display control unit perform control based on a correspondence relation with respect to presence or absence of control between the first control and the second control in a third range in the depth direction, the third range being different from the first range.

(7)

The information processing device according to (6), in which the correspondence relation includes a relation in which one of a change in the position with the first control and a change in the state with the second control is made, and another is not made.

(8)

The information processing device according to (7), in which the correspondence relation includes a first correspondence relation in which a change in the position with the first control is made and a change in the state with the second control is not made, the third range includes a range closer to the user in the depth direction than the first range, and the first display control unit and the second display control unit perform the first control and the second control based on the first correspondence relation in the third range.

(9)

The information processing device according to (7) or (8), in which the correspondence relation includes a second correspondence relation in which a change in the state with the second control is made and a change in the position with the first control is not made, the third range includes a range more distant from the user in the depth direction than the first range, and the first display control unit and the second display control unit perform the first control and the second control based on the second correspondence relation in the third range.

(10)

The information processing device according to any one of (4) to (9), in which the first display control unit and the second display control unit perform the first control and the second control with respect to at least one of a first display object and a second display object according to the correlation so that a position of each of the first display object and the second display object in the depth direction falls within a predetermined range.

(11)

The information processing device according to (10), in which the second display object includes another display object displayed at a same timing as a timing of the first display object.

(12)

The information processing device according to any one of (1) to (11), in which the second control includes control of a size of the display object.

(13)

The information processing device according to any one of (1) to (12), in which the display object includes a stereoscopic vision object, and the first control includes control of parallax between a left eye image and a right eye image for the stereoscopic vision object.

(14)

The information processing device according to any one of (1) to (13), in which the first display control unit and the second display control unit determine states of the first control and the second control on a basis of depth perception information relating to a perception of the depth by the user.

(15)

The information processing device according to (14), in which the first display control unit and the second display control unit determine the first range and the second range on the basis of the depth perception information.

(16)

The information processing device according to (14) or (15), in which the depth perception information includes information regarding a feature of the display object or information regarding a visual state of the display object.

(17)

The information processing device according to any one of (14) to (16), in which the depth perception information includes information regarding an attribute of the user or information regarding a state of the user.

(18)

The information processing device according to any one of (14) to (17), in which the depth perception information includes information regarding an environment surrounding the user.

(19)

An information processing method including:

by a display control unit, performing first control with respect to a position of a display object in a depth direction, the position being perceived by a user on a basis of an eye movement;

performing second control with respect to a state of the display object; the state not including the position in the depth direction as a state;

performing control based on a first relation in a first range in the depth direction; and performing control based on a second relation in a second range in the depth direction, the second relation being different from the first relation, the second range being different from the first range.

(20)

A program causing a computer to implement:

a first display control function of performing first control with respect to a position of a display object in a depth direction, the position being perceived by a user on a basis of an eye movement;

a second display control function of performing second control with respect to a state of the display object, the state not including the position in the depth direction as a state; and a function of performing, by the first display control function and the second display control function, control based on a first relation in a first range in the depth direction, and performing control based on a second relation in a second range in the depth direction, the second relation being different from the first relation, the second range being different from the first range.

REFERENCE SIGNS LIST 100 information processing device
102 image generating unit
104 display control unit
106 storage unit
108 display unit
120 user information acquisition unit
130 environment information acquisition unit

The invention claimed is:

1. An information processing device comprising:

a first display control unit configured to perform first control with respect to a position of a display object in a depth direction, the position being perceived by a user on a basis of an eye movement; and a second display control unit configured to perform second control with respect to a state of the display object, the state not including the position in the depth direction, wherein the first display control unit and the second display control unit perform control based on a first relation in a first range in the depth direction, and perform control based on a second relation in a second range in the depth direction, the second relation being different from the first relation, the second range being different from the first range, wherein the first control and the second control are performed on a basis of a reference position in the depth direction, wherein the control based on the first relation includes control in which, with the first control, an amount relating to a change in the position with respect to the reference position in the depth direction at which the display object is perceived is smaller than an amount relating to a change in the position in the control based on the second relation, and with the second control, an amount relating to a change in the state at the reference position with respect to the state of the display object is larger than an amount relating to a change in the state in the control based on the second relation, and wherein the first display control unit and the second display control unit are each implemented via at least one processor.

2. The information processing device according to claim 1, wherein the first range includes a range closer to the user in the depth direction than the second range.

3. The information processing device according to claim 1, wherein the first relation includes a correlation with respect to a control amount between the first control and the second control.

4. The information processing device according to claim 3, wherein the correlation includes a relation in which a control amount of one of the first control and the second control is a control amount corresponding to a difference between a control amount of another and a control amount of the other at the reference position.

5. The information processing device according to claim 3, wherein the first display control unit and the second display control unit perform control based on a correspondence relation with respect to presence or absence of control between the first control and the second control in a third range in the depth direction, the third range being different from the first range.

6. The information processing device according to claim 5, wherein the correspondence relation includes a relation in which one of a change in the position with the first control and a change in the state with the second control is made, and another is not made.

7. The information processing device according to claim 6, wherein the correspondence relation includes a first correspondence relation in which a change in the position with the first control is made and a change in the state with the second control is not made, the third range includes a range closer to the user in the depth direction than the first range, and the first display control unit and the second display control unit perform the first control and the second control based on the first correspondence relation in the third range.

8. The information processing device according to claim 6, wherein the correspondence relation includes a second correspondence relation in which a change in the state with the second control is made and a change in the position with the first control is not made, the third range includes a range more distant from the user in the depth direction than the first range, and the first display control unit and the second display control unit perform the first control and the second control based on the second correspondence relation in the third range.

9. The information processing device according to claim 3, wherein the first display control unit and the second display control unit perform the first control and the second control with respect to at least one of a first display object and a second display object according to the correlation so that a position of each of the first display object and the second display object in the depth direction falls within a predetermined range.

10. The information processing device according to claim 9, wherein the second display object includes another display object displayed at a same timing as a timing of the first display object.

11. The information processing device according to claim 1, wherein the second control includes control of a size of the display object.

12. The information processing device according to claim 1,
wherein the display object includes a stereoscopic vision object, and
the first control includes control of parallax between a left eye image and a right eye image for the stereoscopic vision object.

13. The information processing device according to claim 1, wherein the first display control unit and the second display control unit determine states of the first control and the second control on a basis of depth perception information relating to a perception of the depth by the user.

14. The information processing device according to claim 13, wherein the first display control unit and the second display control unit determine the first range and the second range on the basis of the depth perception information.

15. The information processing device according to claim 13, wherein the depth perception information includes information regarding a feature of the display object or information regarding a visual state of the display object.

16. The information processing device according to claim 13, wherein the depth perception information includes information regarding an attribute of the user or information regarding a state of the user.

17. The information processing device according to claim 13, wherein the depth perception information includes information regarding an environment surrounding the user.

18. An information processing method, executed by a display control unit implemented via at least one processor, the method comprising:
performing first control with respect to a position of a display object in a depth direction, the position being perceived by a user on a basis of an eye movement;
performing second control with respect to a state of the display object, the state not including the position in the depth direction;
performing control based on a first relation in a first range in the depth direction; and
performing control based on a second relation in a second range in the depth direction, the second relation being different from the first relation, the second range being different from the first range,
wherein the first control and the second control are performed on a basis of a reference position in the depth direction, and
wherein the control based on the first relation includes control in which,
with the first control, an amount relating to a change in the position with respect to the reference position in the depth direction at which the display object is perceived is smaller than an amount relating to a change in the position in the control based on the second relation, and
with the second control, an amount relating to a change in the state at the reference position with respect to the state of the display object is larger than an amount relating to a change in the state in the control based on the second relation.

19. A non-transitory computer-readable storage medium having embodied thereon a program, which when executed by a computer causes the computer to execute a method, the method comprising:
performing first control with respect to a position of a display object in a depth direction, the position being perceived by a user on a basis of an eye movement;
performing second control with respect to a state of the display object, the state not including the position in the depth direction; and
performing control based on a first relation in a first range in the depth direction,
and performing control based on a second relation in a second range in the depth direction, the second relation being different from the first relation, the second range being different from the first range,
wherein the first control and the second control are performed on a basis of a reference position in the depth direction, and
wherein the control based on the first relation includes control in which,
with the first control, an amount relating to a change in the position with respect to the reference position in the depth direction at which the display object is perceived is smaller than an amount relating to a change in the position in the control based on the second relation, and
with the second control, an amount relating to a change in the state at the reference position with respect to the state of the display object is larger than an amount relating to a change in the state in the control based on the second relation.

* * * * *